US012683320B2

(12) United States Patent
Chen et al.

(10) Patent No.: US 12,683,320 B2
(45) Date of Patent: Jul. 14, 2026

(54) CONNECTION DEVICES, CABLE PLUGS, AND CABLE ASSEMBLIES

(71) Applicant: Anker Innovations Technology Co., Ltd., Changsha (CN)

(72) Inventors: Tao Chen, Hunan (CN); Xiang Zhang, Hunan (CN)

(73) Assignee: Anker Innovations Technology Co., Ltd., Changsha (CN)

( * ) Notice: Subject to any disclaimer, the term of this patent is extended or adjusted under 35 U.S.C. 154(b) by 294 days.

(21) Appl. No.: 18/555,350

(22) PCT Filed: Mar. 10, 2022

(86) PCT No.: PCT/CN2022/080197
§ 371 (c)(1),
(2) Date: Oct. 13, 2023

(87) PCT Pub. No.: WO2022/218070
PCT Pub. Date: Oct. 20, 2022

(65) Prior Publication Data

US 2024/0213708 A1 Jun. 27, 2024

(30) Foreign Application Priority Data

Apr. 16, 2021 (CN) ........................ 202110413955.X
Apr. 16, 2021 (CN) ........................ 202110413967.2

(51) Int. Cl.
*H01R 13/518* (2006.01)
*H01R 27/02* (2006.01)

(52) U.S. Cl.
CPC .......... *H01R 13/518* (2013.01); *H01R 27/02* (2013.01)

(58) Field of Classification Search
CPC .............................. H01R 13/518; H01R 27/02
(Continued)

(56) References Cited

U.S. PATENT DOCUMENTS 6,341,981 B1 1/2002 Gorman
7,048,591 B1 5/2006 Chiang
(Continued)

FOREIGN PATENT DOCUMENTS

CN 101969164 A 2/2011
CN 108631100 A 10/2018
(Continued)

OTHER PUBLICATIONS

Jul. 3, 2025 (EP) Office Action—App EP22787300.
(Continued)

*Primary Examiner* — Gary F Paumen
(74) *Attorney, Agent, or Firm* — Banner & Witcoff, Ltd.

(57) ABSTRACT

This application provides a connection device, a cable plug, and a cable assembly. The connection device comprises a housing (e.g., shell) and several wire-insertion components. The housing has a placement cavity and an insertion port, and several wire-insertion components are set in the placement cavity. The wire-insertion components are used to fix one end of the cable and connect with the cable electrically. At least part of the wire-insertion components are exposed through the insertion port, so that the conductive column of the base can be inserted into the insertion port and contact with the wire-insertion component to achieve electrical connection. The connection device can make the installation and removal process of the base simpler, safer, and more convenient to replace the base (e.g., socket) of different functional modules.

19 Claims, 16 Drawing Sheets

(58) Field of Classification Search
USPC .................................................. 439/653, 374
See application file for complete search history.

(56) References Cited

U.S. PATENT DOCUMENTS

| | | | | |
|---|---|---|---|---|
| 2013/0017738 | A1 | 1/2013 | Asakuma et al. | |
| 2014/0148041 | A1* | 5/2014 | Orris .................... | H01R 13/112 439/374 |
| 2016/0134062 | A1* | 5/2016 | Wang ................... | H01R 31/005 439/620.21 |

FOREIGN PATENT DOCUMENTS

| | | | |
|---|---|---|---|
| CN | 110021860 | A | 7/2019 |
| CN | 113328268 | A | 8/2021 |
| CN | 113328269 | A | 8/2021 |
| DE | 102012218028 | A1 | 4/2014 |
| TW | 201312869 | A | 3/2013 |
| TW | M465699 | U | 11/2013 |

OTHER PUBLICATIONS

Jan. 12, 2022—(CN) Office Action—App CN202110413967.2 (20210038CN1-10A).
Jul. 14, 2022—(CN) Office Action—App CN202110413967.2 (20210038CN1-20A).
May 25, 2022—(WO) International Search Report and Written Opinion—App PCT/CN2022/080197.

* cited by examiner

CONNECTION DEVICES, CABLE PLUGS, AND CABLE ASSEMBLIES

CROSS-REFERENCE TO RELATED APPLICATION

The present application is a national stage application of PCT/CN2022/080197, filed on Mar. 10, 2022, which claims priority to CN Application No. 202110413967.2, filed on Apr. 16, 2021, and CN Application 202110413955.X, filed on Apr. 16, 2021. Each of the above applications is incorporated by reference in its entirety.

FIELD

The present invention relates to the field of electronic technology, especially to a connection component, cable plug, and cable assembly.

BACKGROUND

In daily life, it is often necessary to connect a cable with the socket to connect the socket with the power source, for example, a wall plug.

At present, a cable is generally directly connected to the cable interface of the socket to achieve the installation of the socket; but this makes the installation process of the socket more complex and dangerous. In addition, when replacing the socket, for example, when replacing different function wall plug conversion modules, the disassembly process is also more cumbersome.

SUMMARY

The connection component (e.g., device), cable plug, and cable assembly provided in this application can solve the problem that the existing cable and socket installation process is more complex and dangerous, and the disassembly process is also more cumbersome when replacing the socket.

To solve the above technical problems, one technical solution adopted by this application is: to provide a connection component, which comprises: a shell, having a housing cavity and a plug interface; several plug-in components, set in the housing cavity, the plug-in components are used to fix one end of the cable and electrically connect with the cable; and at least part of the plug-in components are exposed through the plug interface, so that the conductive pillar of the socket can be inserted into the plug interface and contact the plug-in components to achieve electrical connection.

To solve the above technical problems, the second technical solution adopted by this application is: to provide a cable plug. The cable plug comprises a cable and a connection component. The connection component is used to fix one end of the cable and electrically connect with the cable. The connection component is the connection component mentioned above.

To solve the above technical problems, the third technical solution adopted by this application is: to provide a cable assembly. The cable assembly comprises a socket and a connection component. The socket has a first end face and a second end face different from the first end face, the first end face of the socket has at least one electric plug hole, and the second end face has a conductive pillar; the connection component is the connection component mentioned above, or the cable plug mentioned above; the conductive pillar of the socket is inserted into the plug interface of the connection component to electrically connect with the connection component, or inserted into the plug interface of the cable plug to electrically connect with the cable plug, thereby supplying power to the socket.

The connection component, cable plug, and cable assembly provided in this application, the connection component is set by setting a shell, and making the shell have a housing cavity and a plug interface; at the same time, several plug-in components are set to fix one end of the cable and electrically connect with the cable through the plug-in components. In addition, several plug-in components are set in the housing cavity, and at least part of the plug-in components are exposed through the plug interface, so that the conductive pillar of the socket can be inserted into the plug interface to contact the plug-in components, thereby making the socket achieve electrical connection with the cable through the plug-in components of the connection component, thereby achieving the installation of the socket. Because the connection component can make the socket insert into the plug interface to contact the plug-in components to achieve electrical connection with the cable, compared with the existing technology that fixes the cable and the socket to achieve their electrical connection, not only the installation process is simpler, and in the disassembly process, the socket can be directly pulled out from the shell through the plug interface to disassemble the socket, thereby making the disassembly process also simpler. And because the connection component makes the installation and disassembly of the socket simpler, it is convenient to replace different function sockets. In addition, because the contact point between the plug-in component and the socket is located inside the shell, and the two achieve the installation and disassembly of the socket through the way of plug and pull contact, compared with the contact point located on the outer surface of the shell or the scheme of manual wiring, it can make the whole installation and disassembly process safer and more reliable.

DETAILED DESCRIPTION

Figure 1:
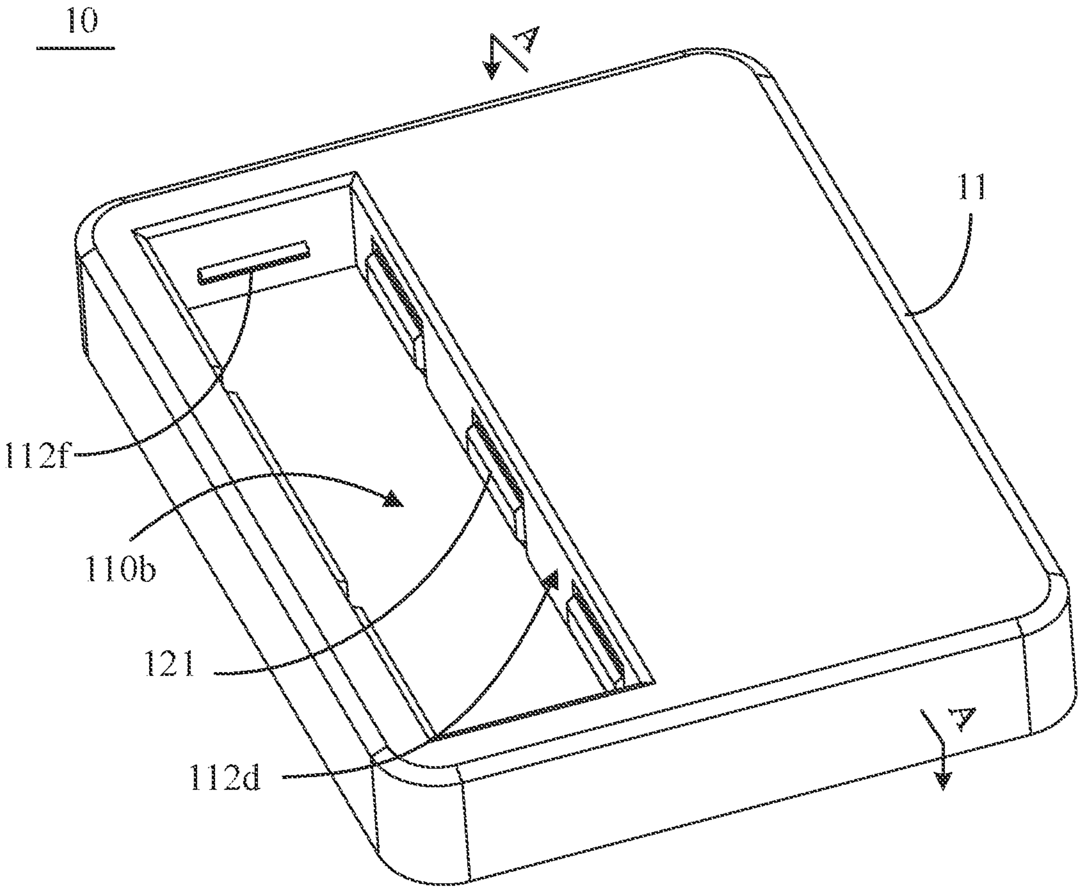
FIG. 1 shows a schematic diagram of the overall structure of a connection component provided in an example of this application.

The following will clearly and completely describe the technical solutions in the examples of this application in conjunction with the drawings in the examples of this application. Obviously, the described examples are only part of the examples of this application, not all examples. Based on the examples in this application, all other examples obtained by ordinary technical personnel in this field without making creative labor belong to the scope of protection of this application.

The terms "first", "second", "third" in this application are only used for descriptive purposes, and cannot be understood as indicating or implying relative importance or implicitly indicating the number of technical features indicated. Therefore, the features defined as "first", "second", "third" can explicitly or implicitly comprise at least one such feature. In the description of this application, the meaning of "multiple" is at least two, such as two, three, etc., unless there is a clear specific limit. All directional indications (such as up, down, left, right, front, back . . . ) in the examples of this application are only used to explain the relative positional relationship between the components under a specific posture (as shown in the drawings), the movement situation, etc. If the specific posture changes, the directional indication will also change accordingly. In addition, the terms "comprise" and "have" and any variants are intended to cover non-exclusive inclusion. For example, a process, method, system, product or device that comprises a series of steps or units is not limited to the listed steps or units, but optionally also comprises unlisted steps or units, or optionally also comprises other steps or units inherent to these processes, methods, products or devices.

The mention of "example" in this document means that the specific features, structures, or characteristics described in connection with the examples can be comprised in at least one example of this application. The phrase in various places in the specification does not necessarily refer to the same example, nor is it an independent or alternative example that is mutually exclusive with other examples. It is explicitly and implicitly understood by those skilled in the art that the examples described in this document can be combined with other examples.

The application will be described in detail below with reference to the drawings and examples.

Figure 2:
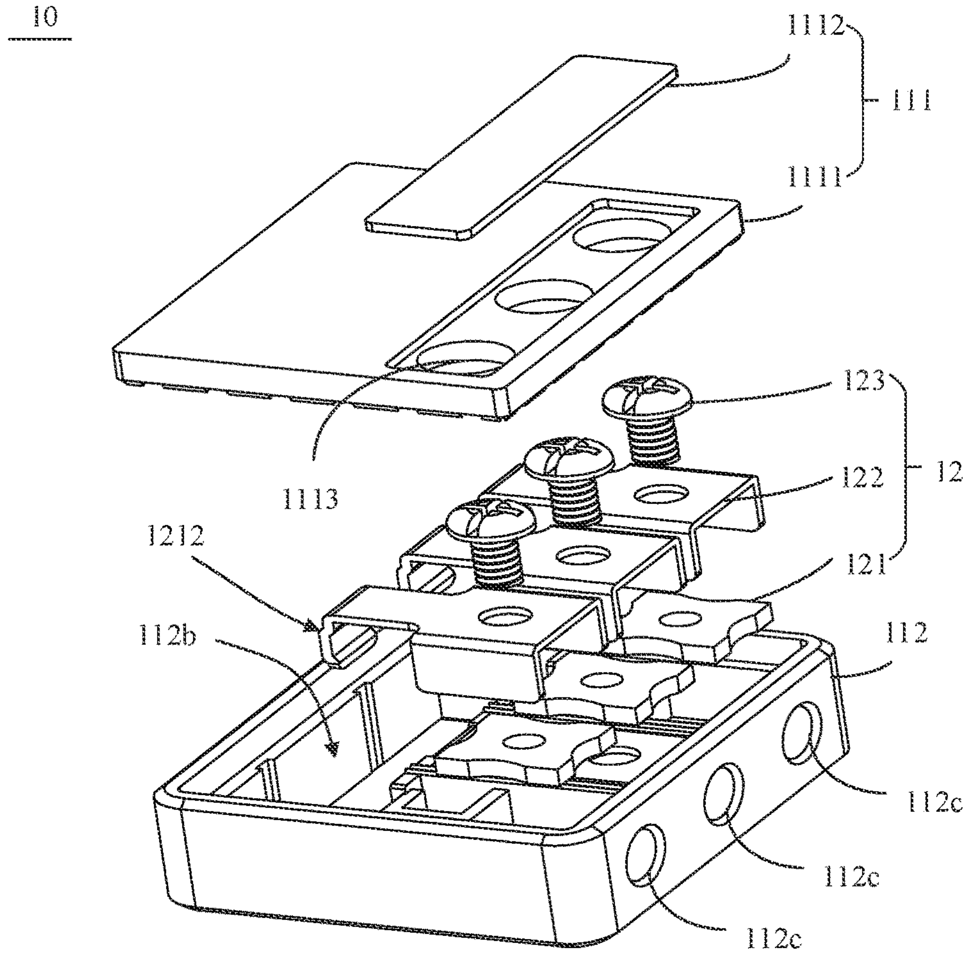
FIG. 2 shows a schematic diagram of the disassembly of the structure shown in FIG. 1 provided in an example of this application.
Figure 3A:
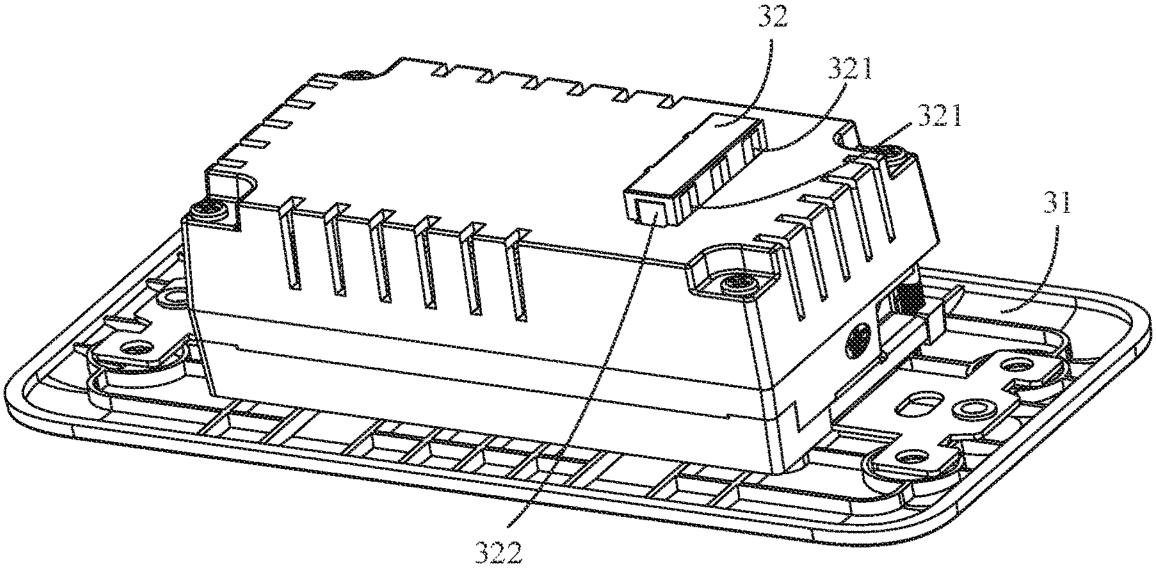
FIG. 3*a* shows a schematic diagram of the structure of a socket under the first vision provided in an example of this application.
Figure 3B:
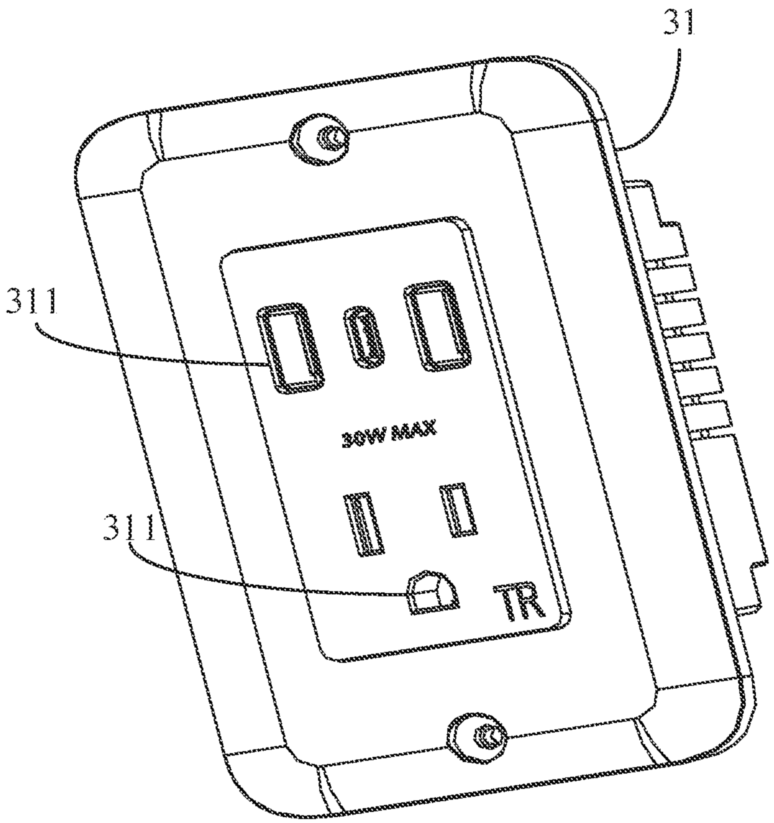
FIG. 3*b* shows a schematic diagram of the structure of the socket under the second vision provided in an example of this application.

Please refer to FIGS. 1 to 3*b*, where FIG. 1 shows a schematic diagram of the overall structure of a connecting component provided in an example of this application; FIG. 2 shows a schematic diagram of the disassembly of the structure shown in FIG. 1 provided in an example of this application; FIG. 3*a* shows a schematic diagram of the structure of a socket provided in an example of this application; FIG. 3*b* shows a schematic diagram of the structure of the socket under a second view provided in an example of this application. In the first example, a connecting component 10 is provided, which is used to fix the cable 21 and electrically connect with the cable 21, so that the socket 30 can achieve electrical connection with the cable 21 by contacting the connecting component 10, thereby achieving the installation of the socket 30.

The specific structure of the socket 30 can be seen in FIG. 3*a*, the socket 30 specifically comprises a main body 31 and a fixing column 32 set on the main body 31. Various electronic components are set inside the main body 31 to achieve corresponding functions, such as an AC module or Type- module; the material of the fixing column 32 is an insulating material, such as plastic or rubber, etc., and an electrical contact point 321 electrically connected with the internal electronic components is set on the outer wall of the fixing column 32, so that the socket 30 can achieve electrical connection by contacting the connecting component 10 through the electrical contact point 321. Specifically, the number of electrical contact points 321 is consistent with the plug-in component 12, and they are set correspondingly. Specifically, the socket 30 can be an AC socket, Type-socket, Type- and Type- compatible socket, Type- socket, or Type- and Type- compatible socket.

Figure 4:
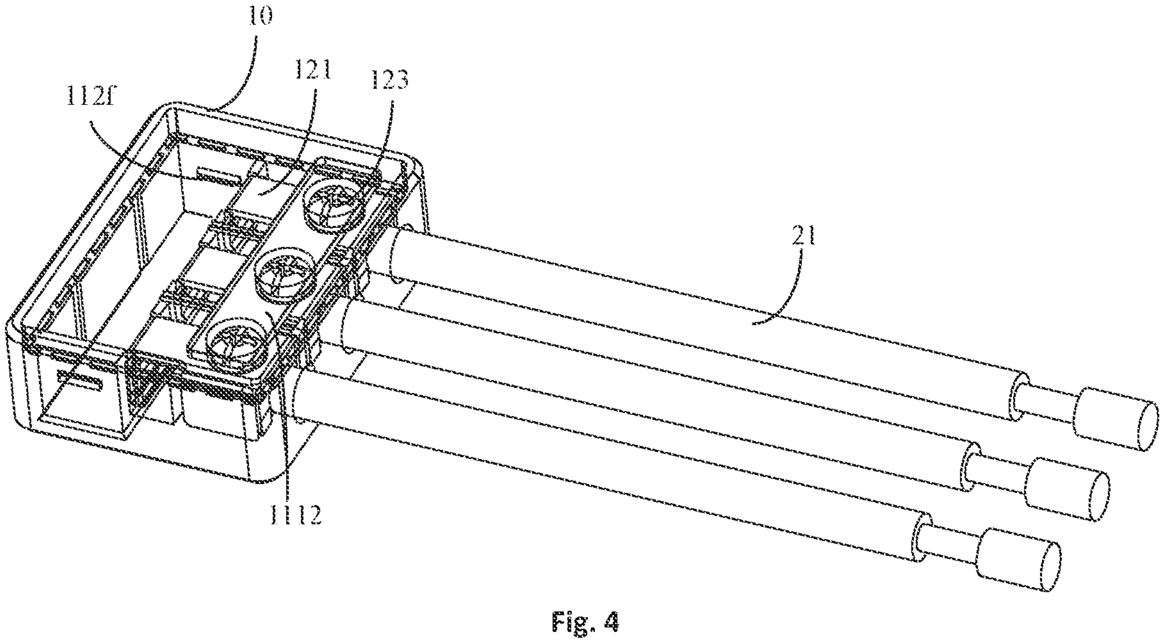
FIG. 4 shows a perspective view of the cable fixed on the connection component provided in an example of this application.

Specifically, refer to FIGS. 2 and 4, FIG. 4 is a perspective view of the cable fixed on the connecting component provided in an example of this application; the connecting component 10 can comprise a shell 11 and several plug-in components 12.

The shell 11 has a housing cavity 110*a* (show in FIG. 8 below) and a card slot 110*b*; the slot of the card slot 110*b* serves as a plug-in port, and the card slot 110*b* is used to be fixedly connected with the fixing column 32 of the socket 30; several plug-in components 12 are set in the housing cavity 110*a*, and the plug-in components 12 are specifically used to fix one end of the cable 21 and electrically connect with the cable 21; the specific structure of the cable 21 fixed on the plug-in component 12 can be seen in FIG. 4; and at least part of the plug-in component 12 protrudes from the housing cavity 110*a* and is located in the card slot 110*b*, and is exposed through the slot of the card slot 110*b*; so that when the fixing column 32 of the socket 30 is inserted into the card slot 110*b* through the plug-in port for fixation, the electrical contact point 321 on the fixing column 32 contacts the part of the plug-in component 12 located in the card slot 110*b*, so as to achieve electrical connection with the cable 21 through the plug-in component 12, thereby completing the installation of the socket 30.

In this case, since the connecting component 10 can achieve electrical connection with the cable 21 by simply making the socket 30 insert into the card slot 110*b* and contact the plug-in component 12 while being fixed with the connecting component 10, compared to the solution in the prior art where the cable 21 and the socket 30 are fixed to achieve electrical connection between the two, not only is the installation process simpler, but also in the disassembly process, the socket 30 can be directly pulled out from the card slot 110*b* to disassemble the socket 30, making the disassembly process of the socket 30 simpler; at the same time, even if there is electricity after the socket 30 is installed, users can replace the socket 30 of different functional modules by themselves, such as replacing wall plug modules with different functions, without the need for professional operation, saving corresponding costs. And because the connecting component 10 makes the installation and disassembly of the socket 30 simpler, it is convenient to replace the socket 30 with different functions. In addition, since the contact point between the plug-in component 12 and the socket 30 is located in the card slot 110*b*, and the installation and disassembly of the socket 30 are achieved by the way of plug and pull contact, compared to the solution where the contact point is located on the surface of the shell 11 or through manual wiring, the entire installation and disassembly process can be safer and more reliable.

Among them, the cable 21 can be a live wire, neutral wire, or ground wire. The cable 21 can correspond to the plug-in component 12 one by one. In an example, the number of plug-in components 12 can be three, the three plug-in components 12 are respectively used to fix one end of the live wire, neutral wire, and ground wire. In this example, the number of electrical contact points 321 on the fixing column 32 is also three, the three electrical contact points 321 correspond to the plug-in components 12 that electrically connect the live wire, neutral wire, and ground wire, so that after the fixing column 32 of the socket 30 is inserted into the card slot 110*b*, it can be electrically connected with the live wire, neutral wire, and ground wire through the plug-in component 12.

Referring to FIG. 2, each plug-in component 12 specifically comprises a first connector 121, a second connector 122, and a fixing member 123.

At least part of the second connector 122 is set opposite to the first connector 121. The fixing member 123 fixes the first connector 121 and the second connector 122 on the shell 11, and is used to fix one end of the cable 21 between the first connector 121 and the second connector 122, so that the cable 21 is electrically connected with the first connector 121. The fixing member 123 can be a screw column, and threads can be correspondingly set on the first connector 121 and the second connector 122, the screw column is fixed on the shell 11 by screwing with the threads on the first connector 121 and the second connector 122. In the specific process of fixing the cable 21, for example, when the fixing member 123 is specifically a screw column, the screw column can be loosened first to separate it from the second connector 122, then the cable 21 is inserted into the housing cavity 110*a* and is located between the first connector 121 and the second connector 122, at this time, the cable 21 is located at one end of the screw column facing the second connector 122, and then the screw column is tightened, so as to fix the cable 21 between the first connector 121 and the second connector 122 and electrically connect it with the first connector 121.

The materials of the first connector 121 and the second connector 122 can both be conductive metal, such as copper. In an example, the length of the first connector 121 is greater than the length of the second connector 122, and the first end of the first connector 121 is set opposite to the second connector 122 and forms a limiting slot 1211. The second connector 122 is set in the limiting slot 1211, after the cable 21 is fixed with the connecting component 10. One end of the cable 21 is specifically fixed between the second connector 122 and the bottom wall of the limiting slot 1211. The second end of the first connector 121 extends into the card slot 110*b* and forms a conductive part 1212, so that after the socket 30 is pressed down to make the fixing column 32 of the socket 30 extend into the card slot 110*b* and be tightly fixed, the electrical contact point 321 on the fixing column 32 continuously contacts the conductive part 1212 of the first connector 121 to achieve electrical connection.

Figure 5:
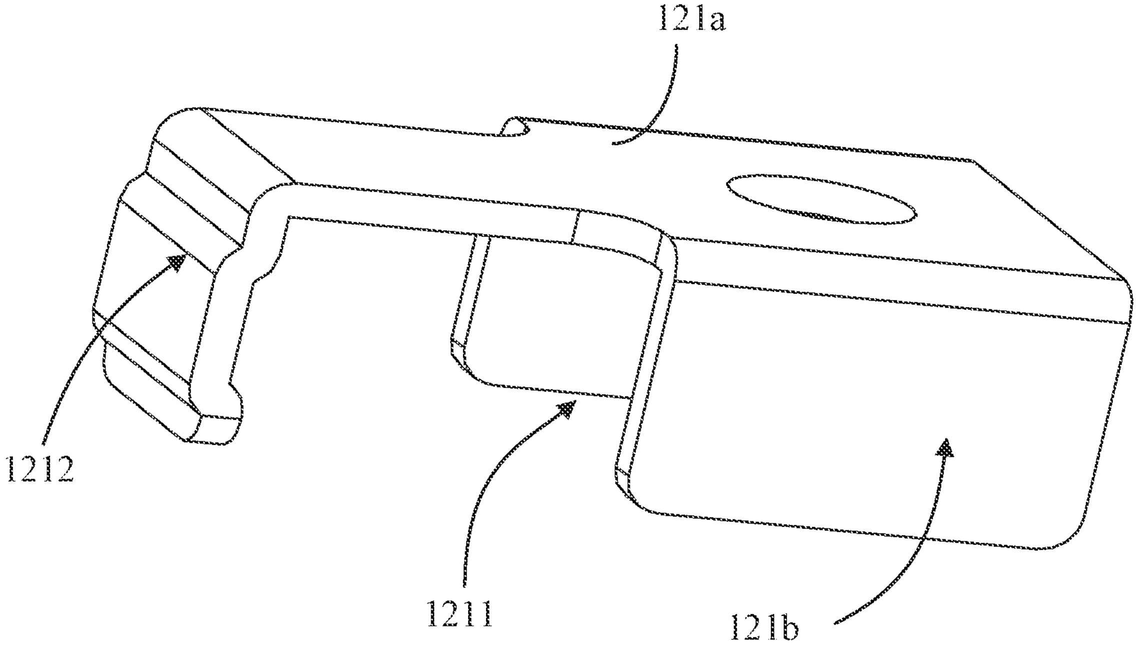
FIG. 5 shows a schematic diagram of the structure of the first connector provided in an example of this application.

In an example, refer to FIG. 5, FIG. 5 shows a schematic diagram of the structure of the first connector provided in an example of this application; the first connector 121 specifically can comprise a metal base 121*a* and two first protruding ears 121*b*.

The metal base 121*a* can be a long strip-shaped base, the long strip-shaped base has a first end and a second end set opposite to each other along its length direction. The two first protruding ears 121*b* are set opposite to each other on the opposite sides of the first end of the metal base 121*a* along the width direction of the metal base 121*a*, and extend relative to the metal base 121*a* in a direction perpendicular to the metal base 121*a*, to form a limiting slot 1211 in cooperation with the metal base 121*a*. It can be understood that the limiting slot 1211 is open in the axial direction and laterally, and the lateral opening direction faces the second connector 122. The second end of the metal base 121*a* extends into the card slot 110*b* and forms a conductive part 1212, to achieve electrical connection by contacting the electrical contact point 321 on the fixing column 32.

Figure 6:
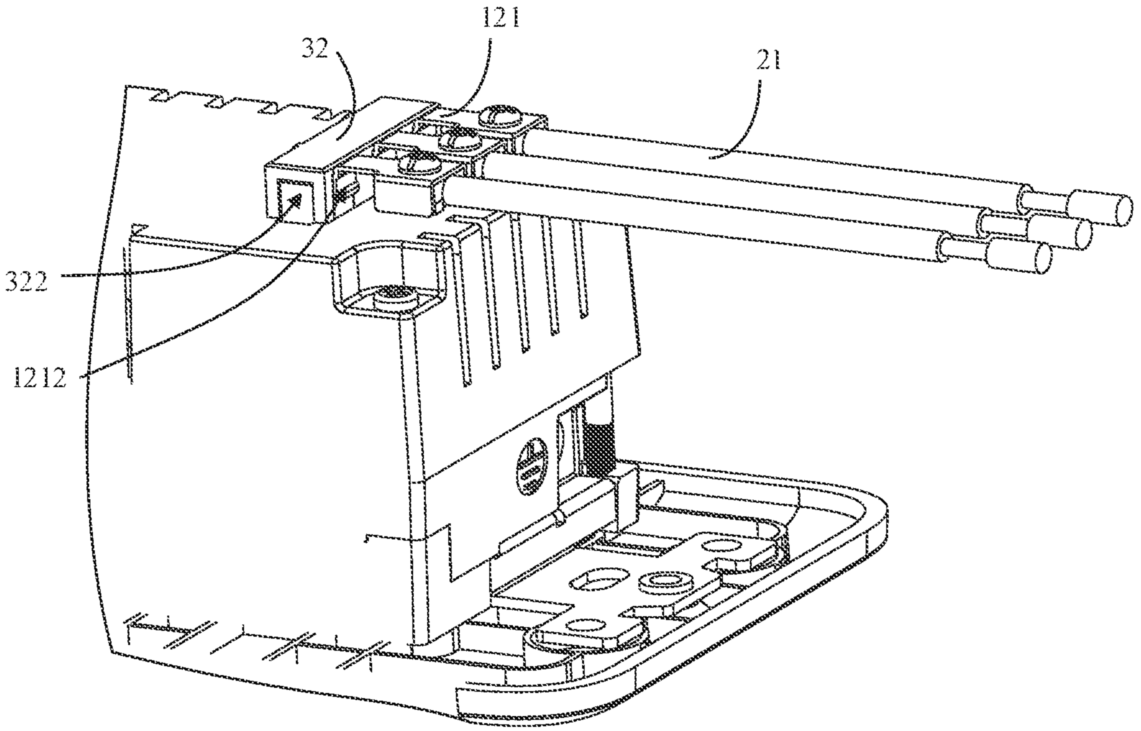
FIG. 6 shows a schematic diagram of the structure at the contact position of the electrical contact point on the fixing column of the first connector and the socket provided in an example of this application.

In an example, in order to increase the contact area between the first connector 121 and the electrical contact point 321 on the fixing column 32, and to ensure effective contact between the two, the second end of the metal base 121*a* can be bent towards the extension direction of the first protruding ear 121*b* after extending into the card slot 110*b*, the bent part forms the conductive part 1212 of the first connector 121, and the electrical contact point 321 on the fixing column 32 abuts against the conductive part 1212 in a direction perpendicular to the plane where the conductive part 1212 is located. Specifically, the schematic diagram of the contact position between the first connector 121 corresponding to this example and the electrical contact point 321 on the fixing column 32 can be seen in FIG. 6. FIG. 6 shows a schematic diagram of the structure at the contact position between the first connector provided in an example of this application and the electrical contact point on the fixing column of the socket.

Specifically, referring to FIG. 2, the shell 11 specifically comprises an upper shell 111 and a lower shell 112.

Figure 7:
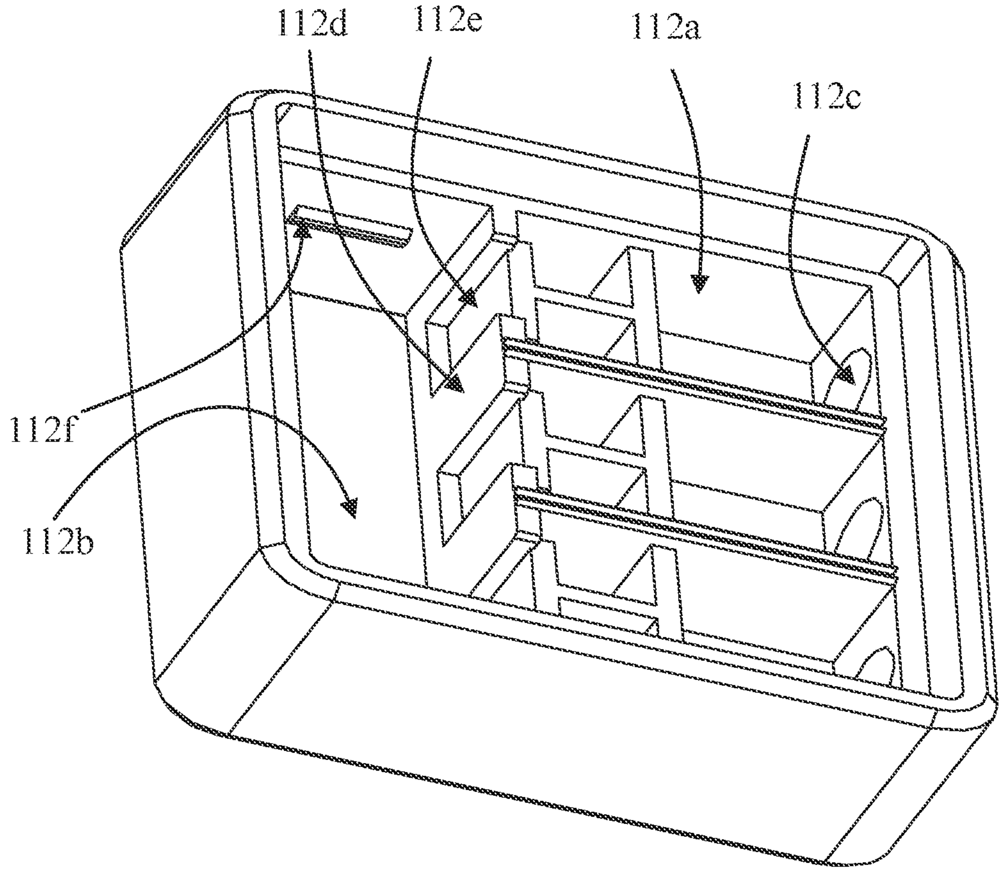
FIG. 7 shows a schematic diagram of the structure of the lower shell provided in an example of this application.

Specifically, referring to FIG. 7, FIG. 7 shows a schematic diagram of the structure of the lower shell provided by an example of the present application, the lower shell 112 has a plurality of accommodating slots 112*a* and a through hole 112*b* that are insulated from each other and spaced apart, a plurality of wiring components 12 are embedded in the plurality of accommodating slots 112*a*, and correspond to the plurality of accommodating slots 112*a* one by one, that is, one wiring component 12 is embedded in one accommodating slot 112*a*; and each accommodating slot 112*a* has a threading hole 112*c* on the side wall thereof, so that the cable 21 can pass through the threading hole 112*c* and extend into the accommodating slot 112*a* and be fixed with the wiring component 12. Specifically, a plurality of accommodating slots 112*a* can be arranged side by side and located on the same side of the through hole 112*b*.

Specifically, referring to FIGS. 2 and 7, the lower shell 112 comprises a bottom wall, an annular side wall and a plurality of partitions. The plurality of partitions divide the interior space of the lower shell 112 into a plurality of accommodating slots 112*a* and a through hole 112*b*, and a portion of the annular side wall and a partition cooperate to form the through hole 112*b*, a plurality of partitions, the bottom wall and a portion of the annular side wall cooperate to form a plurality of accommodating slots 112*a*. The annular side wall specifically presents a rectangle, and the threading hole 112*c* is specifically set on the annular side wall. Referring to FIG. 2, three threading holes 112*c* can be located on the same side edge of the annular side wall, the bottom wall can have a mounting seat near one end of the threading hole 112*c*, and the wiring component 12 is specifically installed on the mounting seat. In an example, the mounting seat can have a threaded hole for installation and fixation by a screw column.

Referring to FIG. 2, one end of the accommodating slot 112*a* far from the threading hole 112*c* has a common side wall 112*d* with the through hole 112*b*, the second end of the first connector 121 specifically extends into the through hole 112*b* and bends in the direction away from the upper shell 111 to form a conductive part 1212, and the conductive part 1212 is specifically set on the side surface of the common side wall 112*d* facing the card slot 110*b*, and can be spaced apart from the position near the bottom of the common side wall 112*d*, that is, the conductive part 1212 does not extend to the port of the through hole 112*b*.

In an example, referring to FIG. 7, a groove 112*e* is formed on the side surface of the common side wall 112*d* facing the card slot 110*b*, the conductive part 1212 is specifically embedded in the groove 112*e*, and the conductive part 1212 is at least flush with the opening of the groove 112*e* facing the card slot 110*b*, or at least part of the conductive part 1212 protrudes from the opening of the groove 112*e* facing the card slot 110*b*, that is, part of the conductive part 1212 protrudes or bends towards the card slot 110*b* (refer to FIG. 1). In an example, after the fixing column 32 extends into the card slot 110*b*, the fixing column 32 squeezes the conductive part 1212 of the first connector 121, the protruding or bending part of the conductive part 1212 shrinks into the groove 112*e*, to ensure that the fixing column 32 can effectively abut against the conductive part 1212 after being inserted into the card slot 110*b*, thereby achieving electrical connection.

Figure 8:
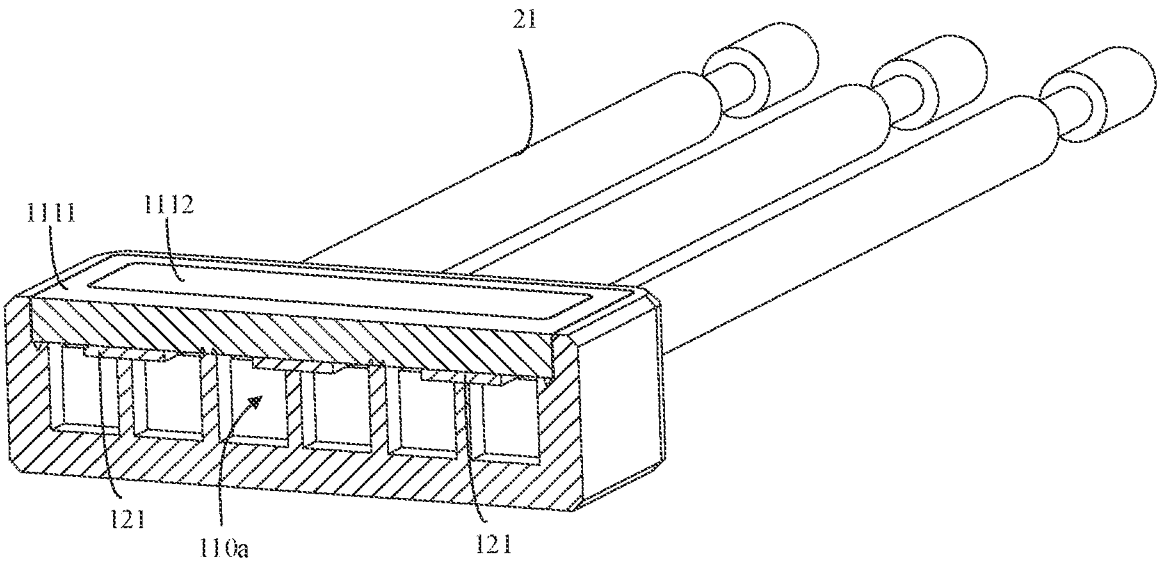
FIG. 8 shows a schematic diagram of the A-A cross-section of the structure shown in FIG. 1 provided in an example of this application.

Specifically, the number of accommodation slots 112*a* is consistent with the number of plug-in components 12, which can also be three, and the live wire, neutral wire, and ground wire extend into the accommodation slot 112*a* through the threading hole 112*c* corresponding to the accommodation slot 112*a* to fix and achieve electrical connection with the plug-in component 12 currently in the accommodation slot 112*a*. FIG. 8 is a cross-sectional schematic view of the structure shown in FIG. 1 provided by an example of this application. Specifically, the two adjacent accommodation slots 112*a* can be completely insulated and isolated by double ultrasonic, to achieve complete isolation between the two adjacent plug-in components 12, avoiding short circuit problems.

On the inner hole wall of the through hole 112*b*, there may also be provided a first buckle piece 112*f*, and the fixing column 32 of the socket 30 is provided with a second buckle piece 322 at a position corresponding to the first buckle piece 112*f*, so as to realize the buckle fixing of the connection component 10 and the socket 30 after the socket 30 is inserted into the card slot 110*b*, through the buckle of the first buckle piece 112*f* and the second buckle piece 322. Specifically, one of the first buckle piece 112*f* and the second buckle piece 322 can be a protrusion, and the other can be a buckle slot; and the number of the first buckle pieces 112*f* can be two. The two first buckle pieces 112*f* are set opposite to each other on the other side wall of the through hole 112*b* different from the common side wall 112*d*, and correspond to the second buckle pieces 322 one by one.

The upper shell 111 is specifically covered on the lower shell 112, forms a card slot 110*b* in cooperation with the through hole 112*b*, and forms an accommodation cavity 110*a* in cooperation with a plurality of accommodation slots 112*a*.

In an example, referring to FIG. 2, the upper shell 111 can specifically comprise a panel 1111 and a cover plate 1112. The panel 1111 is covered on the lower shell 112. Specifically, the panel 1111 can be fixed by means of adhesive, ultrasonic or buckle, and the upper surface of the panel 1111 can be flush with the upper surface of the lower shell 112. In an example, the panel 1111 also has a plurality of through holes 1113. The plurality of through holes 1113 correspond to the plurality of accommodation slots 112*a* one by one, so that the fixing member 123 of the plug-in components 12 are exposed through the through holes 1113. In this way, in the specific use process, after the panel 1111 and the lower shell 112 are installed, the fixing member 123 can be twisted through the through hole 1113 to fix the cable 21 between the first connector 121 and the second connector 122 or to disassemble the cable 21 from between the first connector 121 and the second connector 122 through the through hole 1113, compared with the scheme of disassembling the entire upper shell 111 to install or disassemble the cable 21, it can improve the operation safety, and can save the disassembly and installation process of the panel 1111 in the process of fixing the cable 21, making the entire operation process simpler.

In other examples, the number of through holes 1113 can also be one, and several fixing member 123 in the accommodation slot 112*a* can all be exposed through this through hole 1113. This example does not limit this, as long as it can expose the fixing member 123 of the plug-in component 12, it is convenient to twist the fixing member 123 outside the shell 11.

The cover plate 1112 is covered on the side surface of the panel 1111 away from the lower shell 112, for shielding a plurality of through holes 1113. In an example, the side surface of the panel 1111 away from the lower shell 112, and a receiving groove is formed at the position corresponding to a plurality of through holes 1113. A plurality of through holes 1113 are located at the bottom of the receiving groove, and are connected with the bottom of the receiving groove. The cover plate 1112 is specifically embedded in the receiving groove, to shield a plurality of through holes 1113. The side surface of the cover plate 1112 away from the through hole 1113 can be flush with the side surface of the panel 1111 away from the lower shell 112, so as to make the surface of the upper shell 111 smooth. The material of the cover plate 1112 can be an insulating material, such as plastic or rubber, to play a certain insulating role.

In an example, the cover plate 1112 is fixed to the panel 1111 by means of adhesive, ultrasonic or buckle. For example, a plurality of protrusions can be formed at the bottom of the receiving groove at positions different from the plurality of through holes 1113, and a plurality of pits corresponding to the plurality of protrusions are formed at positions on the cover plate 1112 corresponding to the plurality of protrusions. After the cover plate 1112 is embedded in the receiving groove, the protrusions are buckled into the pits to fix the cover plate 1112 in the receiving groove. In an example, the protrusions can also be formed on the side wall of the cover plate 1112, and this example does not limit this, as long as it can achieve buckle fixing.

In an example, in order to facilitate the disassembly of the cover plate 1112 from the panel 1111, a hook ring can also be provided on the side surface of the cover plate 1112 away from the through hole 1113, so as to pull the cover plate 1112 out of the receiving groove by applying a force on the hook ring. Specifically, a storage groove can also be formed on the side surface of the cover plate 1112 away from the through hole 1113, and the hook ring can specifically be stored in the storage groove, and the hook ring can be configured between a first state and a second state. Specifically, when the hook ring is in the first state, the hook ring is located in the storage groove, so as to reduce the spatial volume of the connection component 10, when the hook ring is in the second state, the hook ring is located outside the storage groove, so as to enable the user to plug and unplug the cover plate 1112 from the receiving groove through the hook ring. Of course, in other examples, a groove body that does not communicate with the accommodation slot 112*a* can also be directly formed on the side surface of the cover plate 1112 away from the through hole 1113, so that the user's fingers or other devices can extend into it, which is convenient for applying a force to pull off the cover plate 1112.

The provided connection component 10 can fix the cable 21 and electrically connect with the cable 21, so that the socket 30 can achieve electrical connection with the cable 21 through the connection component 10, and the socket 30 can be fixed and electrically connected with the connection component 10 in a pluggable manner. Even if the socket 30 and the cable 21 have been installed to achieve electrical connection, different functional sockets 30 can be replaced more conveniently, and in the whole process, there is no need to replace the electrified parts again, that is, there is no need to use other cables 21 to communicate with the power supply when using other functional sockets 30. At the same time, because the connection component 10 facilitates the replacement of the socket 30, the socket 30 can be a single-function socket 30, and when it is necessary to use other functional sockets 30, the current socket 30 can be replaced to meet user needs, compared with the prior art, in order to improve the function of the current wall plug, the scheme of setting multiple functional modules on the same socket 30 greatly reduces the floor area and spatial volume of the socket 30, making the space occupancy rate of the whole wall plug smaller, effectively improving the satisfaction of user experience.

The connection component 10 provided in this example is configured with a shell 11, and the shell 11 has an accommodation cavity 110*a* and a card slot 110*b*, so as to be fixedly connected with the fixing column 32 of the socket 30 through the card slot 110*b*. At the same time, a plurality of plug-in components 12 are set up, and the plug-in components 12 are set in the accommodation cavity 110*a*, so as to fix one end of the cable 21 and electrically connect with the cable 21 through the plug-in components 12. In addition, at least part of the plug-in components 12 protrudes from the accommodation cavity 110*a* and is located in the card slot 110*b*, so that when the fixing column 32 of the socket 30 is inserted into the card slot 110*b* for fixing, the electrical contact point 321 on the fixing column 32 contacts with the part of the plug-in components 12 located in the card slot 110*b* and realizes electrical connection, thereby realizing the electrical connection between the socket 30 and the cable 21, so as to complete the installation of the socket 30. Since the connection component 10 can make the socket 30 insert into the card slot 110*b* to fix with the connection component 10 and contact with the plug-in components 12 to realize the electrical connection with the cable 21, compared with the scheme in the prior art that fixes the cable 21 with the socket 30 to realize the electrical connection between the two, not only the installation process is simpler, but also in the disassembly process, the socket 30 can be directly pulled out from the card slot 110*b* to disassemble the socket 30, thus making the disassembly process of the socket 30 simpler. Since the connection component 10 makes the installation and disassembly of the socket 30 simpler, it is convenient to replace different functional sockets 30. In addition, since the contact point between the plug-in components 12 and the socket 30 is located in the card slot 110*b*, and the two realize the installation and disassembly of the socket 30 through the plug-in contact mode, compared with the scheme that the contact point is located on the surface of the shell 11 or the manual wiring scheme, the whole installation and disassembly process is safer and more reliable.

Figure 9:
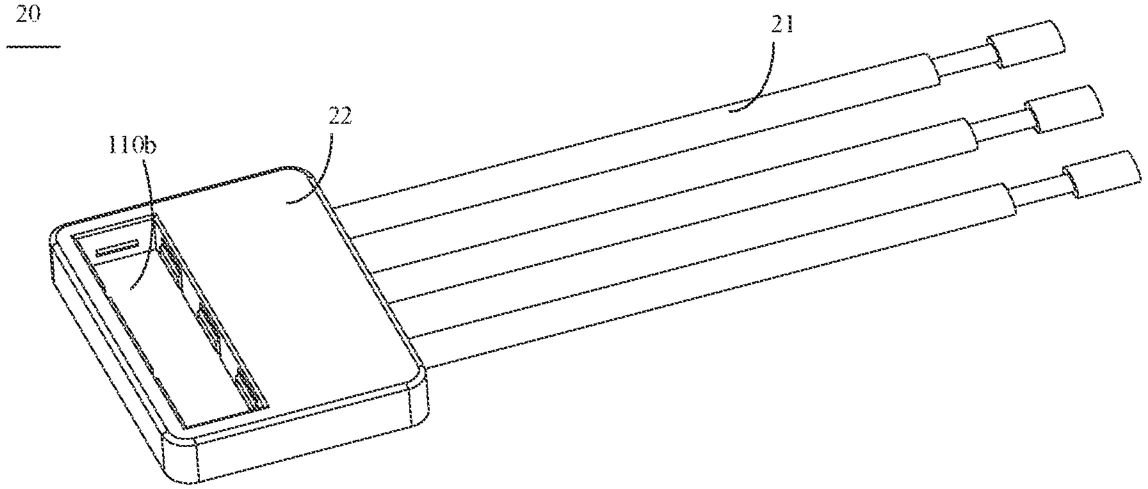
FIG. 9 shows a schematic diagram of the overall structure of the cable plug provided in an example of this application.
Figure 10:
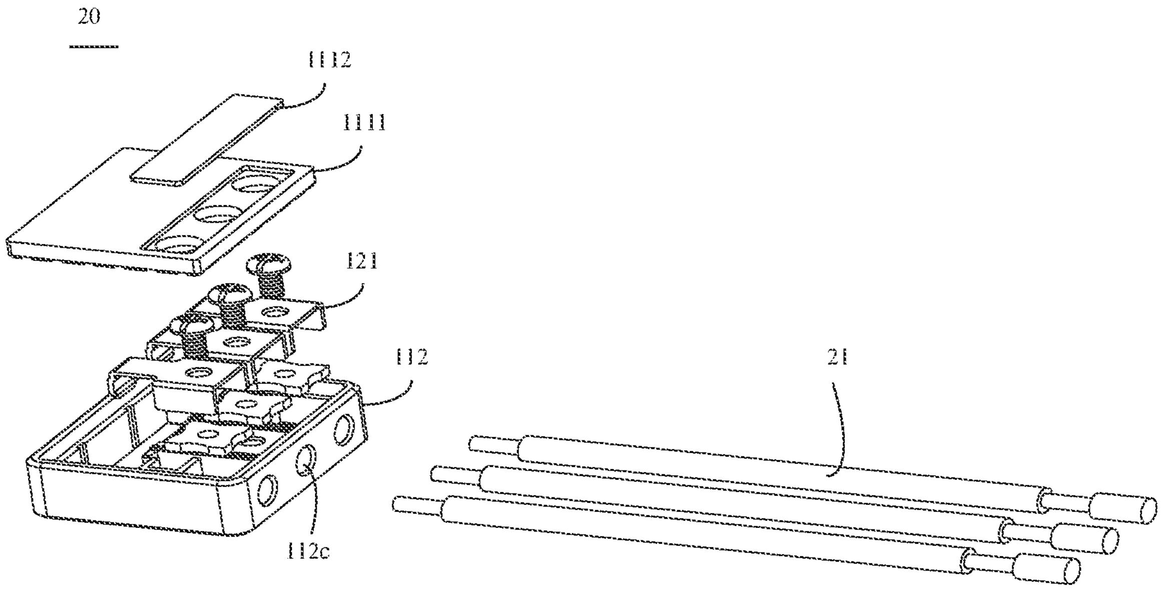
FIG. 10 shows a schematic diagram of the disassembly of the structure shown in FIG. 9 provided in an example of this application.

Please refer to FIGS. 9 to 10, where FIG. 9 shows a schematic diagram of the overall structure of a cable plug provided by an example of this application; FIG. 10 shows a schematic diagram of the disassembly of the structure shown in FIG. 9 provided by an example of this application. In the first example, a cable plug 20 is provided. The cable plug 20 may comprise: a cable 21 and a connector 22.

The cable 21 can be a live wire, a neutral wire, or a ground wire. The connector 22 is used to fix one end of the cable 21 and electrically connect with the cable 21; and the connector 22 can specifically be the connector 10 provided in the first example. The specific structure and function of the connector 22 and the connection and fixation relationship with the cable 21 can refer to the relevant text description of the connection and fixation relationship between the connector 10 provided by the above examples and the cable 21, which is not repeated here.

In an example, the number of cables 21 can be three, the three cables 21 are respectively a live wire, a neutral wire, and a ground wire. The connector 22 can specifically comprise three plug-in components 12, the three plug-in components 12 are respectively used to fix the live wire, the neutral wire, and the ground wire and electrically connect with them. The specific fixation method can refer to the above relevant text description, which is not repeated here.

The cable plug 20 provided by this example, by setting the cable 21 and the connector 22, and setting the connector 22 to comprise a housing 11, and making the housing 11 have a housing cavity 110*a* and a card slot 110*b*, achieves a fixed connection between the two through the card slot 110*b* and the fixed column 32 of the socket 30. At the same time, setting a plurality of plug-in components 12, and setting the plurality of plug-in components 12 in the housing cavity 110*a*, to fix one end of the cable 21 and electrically connects with the cable 21 through the plug-in component 12. In addition, by making at least part of the plug-in component 12 protrude from the housing cavity 110*a* and located in the card slot 110*b*, when the fixed column 32 of the socket 30 is inserted into the card slot 110*b* for fixation, the electrical contact point 321 on the fixed column 32 contacts the part of the plug-in component 12 located in the card slot 110*b* and realizes electrical connection, thereby realizing the electrical connection between the socket 30 and the cable 21, to complete the installation of the socket 30. Since the connector 22 can make the socket 30 insert into the card slot 110*b* and fix with the connector 22 and contact the plug-in component 12 to achieve electrical connection with the cable 21, compared with the scheme in the prior art that fixes the cable 21 and the socket 30 to achieve electrical connection between the two, not only the installation process is simpler, but also in the disassembly process, the socket 30 can be directly pulled out from the card slot 110*b* to disassemble the socket 30, thus making the disassembly process of the socket 30 simpler. Because the connector 22 makes the installation and disassembly of the socket 30 simpler, it is convenient to replace the socket 30 with different functions. In addition, since the contact point between the plug-in component 12 and the socket 30 is located in the card slot 110*b*, and the two realize the installation and disassembly of the socket 30 through the plug-in and pull-out contact method, compared with the scheme where the contact point is located on the surface of the housing 11 or through manual wiring, the entire installation and disassembly process is safer and more reliable.

Figure 11:
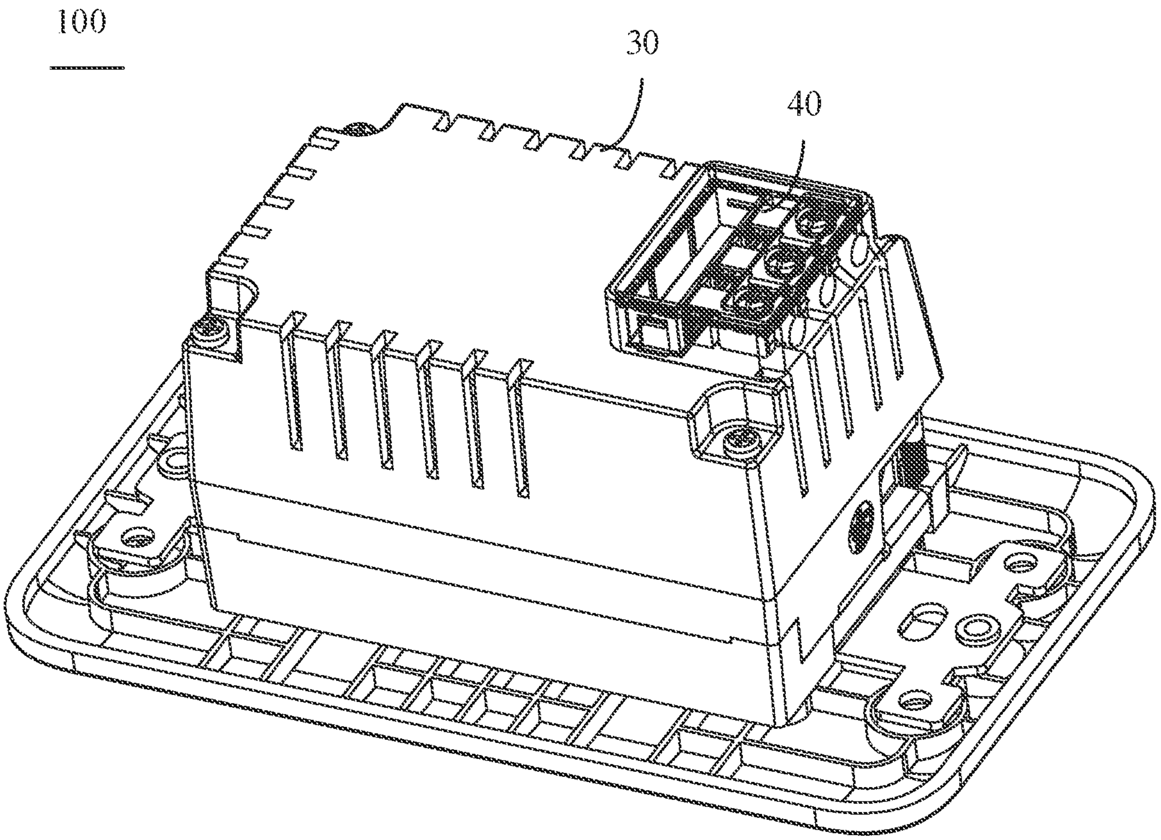
FIG. 11 shows a schematic diagram of the structure of the cable assembly provided in an example of this application.
Figure 12:
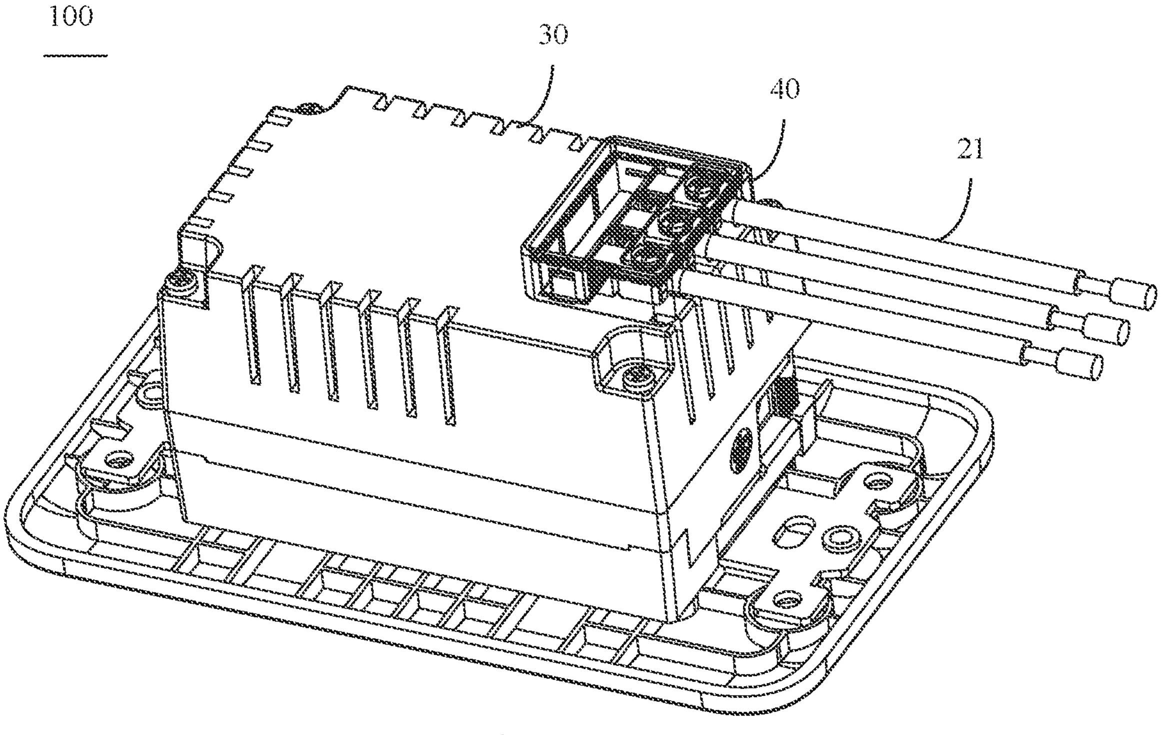
FIG. 12 shows a schematic diagram of the structure of the cable assembly provided in another example of this application.
Figure 13:
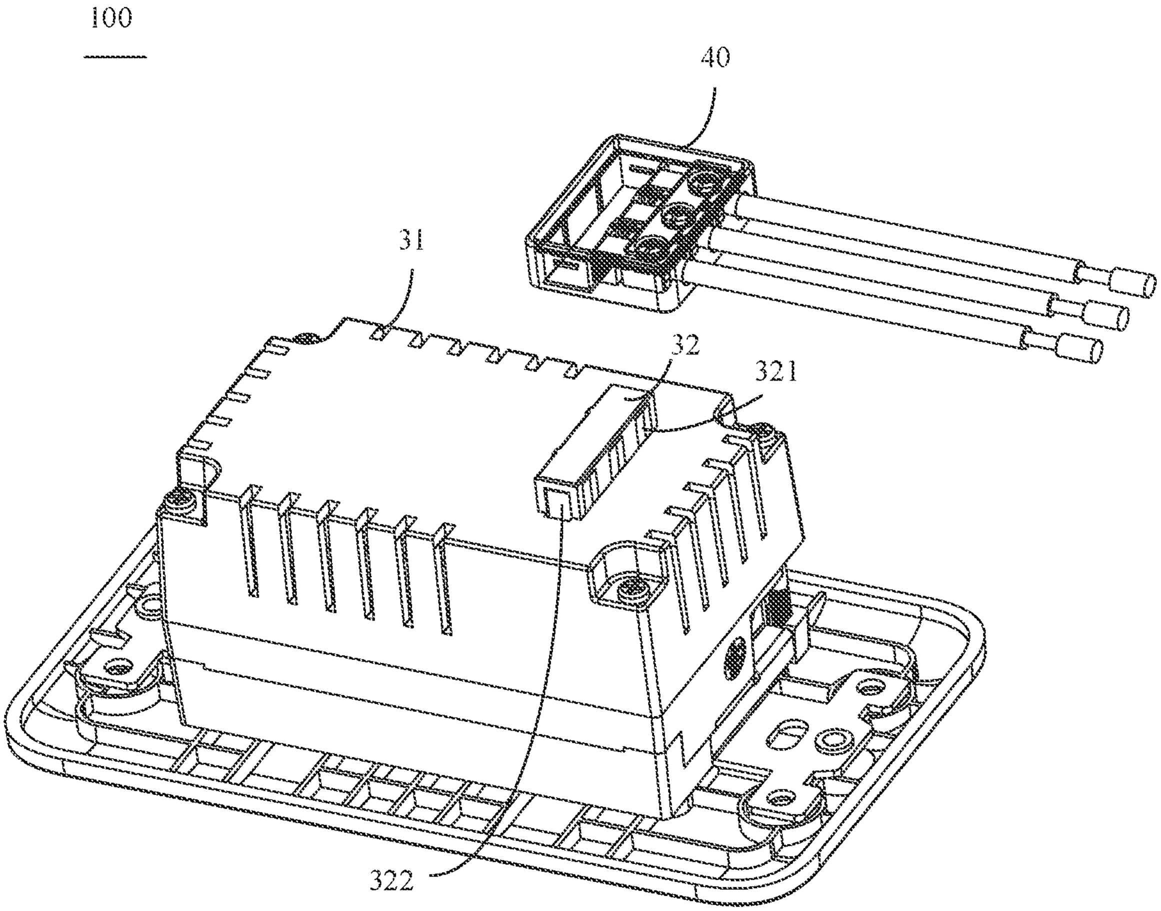
FIG. 13 shows a schematic diagram of the disassembly of the structure shown in FIG. 12 provided in an example of this application.

Please refer to FIGS. 11 to 13, where FIG. 11 shows a schematic diagram of the structure of a cable assembly provided by an example of this application. FIG. 12 shows a schematic diagram of the structure of a cable assembly provided by another example of this application. FIG. 13 is a schematic diagram of the disassembly of the structure shown in FIG. 12 provided by an example of this application. In the first example, a cable assembly 100 is provided, which specifically can comprise a socket 30 and a connector 40.

The connector 40 can be the connector 10 provided by the first example. Specifically, in this example, the specific structure of the cable assembly 100 can be seen in FIG. 11. Of course, the connector 40 can also be the cable plug 20 provided by the above first example. Specifically, in this example, the specific structure of the cable assembly 100 can be seen in FIGS. 12 and 13.

Referring to FIGS. 3*a* and 3*b*, the socket 30 has a first end face and a second end face different from the first end face. The first end face of the socket 30 has at least one electrical socket 311 for the insertion of the electrical plug of an external device. The second end face of the socket 30 has a fixed column 32. The fixed column 32 of the socket 30 is used to extend into the card slot 110*b* of the connector 10 to achieve the card connection and electrical connection between the two, or extend into the card slot 110*b* of the cable plug 20 to achieve the card connection and electrical connection between the two, thereby supplying power to the socket 30 through the connector 40. The size of the fixed column 32 matches the card slot 110*b* to make the two tightly fixed.

Specifically, the first end face and the second end face of the socket 30 can be set back to back, and an electric socket 311 of one function, such as a triangular hole, can be set on the first end face of the socket 30. In specific examples, the socket 30 can be an AC socket, a Type- socket, a Type- and Type- compatible socket, a Type- socket, or a Type- and Type- compatible socket.

Specifically, the card slot 110*b* can be a rectangular slot, and part of the plug-in component 12 of the connecting component 40 protrudes from the accommodating slot 112*a* and is located on the side wall of the card slot 110*b*. The fixing column 32 can be a rectangular block, and its material can specifically be an insulating material, such as plastic or rubber. In specific examples, an electrical contact point 321 that is electrically connected to the internal electronic components of the main body 31 is set on the outer side wall of the fixing column 32, and the electrical contact point 321 specifically corresponds to the plug-in component 12 on the side wall of the card slot 110*b*, so that after the fixing column 32 is inserted into the card slot 110*b* and the connecting component 40 is fixed, the electrical contact point 321 on the fixing column 32 can contact the part of the plug-in component 12 located in the card slot 110*b*, thereby enabling the socket 30 to achieve electrical connection with the cable 21 through the electrical contact point 321 and the plug-in component 12, and enabling the fixing column 32 to achieve the electrical connection of the socket 30 while fixing the socket 30, compared with the scheme in the existing technology where the cable 21 and the socket 30 are fixed to achieve their electrical connection. Not only is the installation process simpler, but also in the disassembly process, the socket 30 can be directly pulled out from the card slot 110*b* to disassemble the socket 30, thereby making the disassembly process of the socket 30 simpler, and because the connecting component 10 makes the installation and disassembly of the socket 30 simpler, it is convenient to replace the socket 30 with different functions. In addition, because the contact point between the plug-in component 12 and the socket 30 is located in the card slot 110*b*, and the two achieve the installation and disassembly of the socket 30 through the plug-in contact method, compared with the scheme where the contact point is located on the surface of the shell 11 or through manual wiring, the entire installation and disassembly process can be safer and more reliable.

Specifically, referring to FIG. 3*a*, a second buckle piece 322 is also set on the outer side wall of the fixing column 32, and the second buckle piece 322 is used to cooperate with the first buckle piece 112*f* in the card slot 110*b* of the connecting component 10 to tightly fix the fixing column 32 in the card slot 110*b*, to prevent the socket 30 from falling from the card slot 110*b*. Specifically, the second buckle piece 322 can be a buckle slot, and the first buckle piece 112*f* can be a protrusion that matches the buckle slot. The specific scheme for the first buckle piece 112*f* and the second buckle piece 322 to cooperate to fix the socket 30 on the connecting component 40 can refer to the relevant text description of the socket 30 fixed in the connecting component 10 provided in the above example, and can achieve the same or similar technical effects, which will not be repeated here.

Specifically, other specific schemes for the fixing column 32 of the socket 30 to achieve fixation and electrical connection with the connecting component 10 or the cable plug 20 can refer to the relevant text description involved in the connecting component 10 provided in the above example, and can achieve the same or similar technical effects, which will not be repeated here.

The cable component 100 provided by the example, through the setting of the socket 30 and the connecting component 40, where the connecting component 40 can specifically be the connecting component 10 or the cable plug 20 involved in the above example. The cable component 100, by setting an electric socket 311 on the first end face of the socket 30 for the electric plug to insert, and setting a fixing column 32 on the second end face of the socket 30, to achieve the card fixing and electrical connection of the two by extending the fixing column 32 into the card slot 110*b* of the connecting component 10, or extending into the card slot 110*b* of the cable plug 20 to achieve the card fixing and electrical connection of the two, thereby supplying power to the socket 30 through the connecting component 40. At the same time, by setting a number of plug-in components 12 on the connecting component 10, and setting a number of plug-in components 12 in the accommodating cavity 110*a* of the connecting component 10, to fix one end of the cable 21 through the plug-in component 12 and electrically connect with the cable 21. In addition, by making at least part of the plug-in component 12 protrude from the accommodating cavity 110*a* and located in the card slot 110*b*, to make the electrical contact point 321 on the fixing column 32 contact the part of the plug-in component 12 located in the card slot 110*b* and achieve electrical connection while the fixing column 32 of the socket 30 is inserted into the card slot 110*b* for fixing, thereby achieving the electrical connection between the socket 30 and the cable 21, to complete the installation of the socket 30. Because the connecting component 10 can make the socket 30 insert into the card slot 110*b* and fix with the connecting component 10 while contacting the plug-in component 12 to achieve electrical connection with the cable 21, compared with the scheme in the existing technology where the cable 21 and the socket 30 are fixed to achieve their electrical connection. Not only is the installation process simpler, but also in the disassembly process, the socket 30 can be directly pulled out from the card slot 110*b* to disassemble the socket 30, thereby making the disassembly process of the socket 30 simpler, and because the connecting component 10 makes the installation and disassembly of the socket 30 simpler, it is convenient to replace the socket 30 with different functions. In addition, because the contact point between the plug-in component 12 and the socket 30 is located in the card slot 110*b*, and the two achieve the installation and disassembly of the socket 30 through the plug-in contact method, compared with the scheme where the contact point is located on the surface of the shell 11 or through manual wiring, the entire installation and disassembly process can be safer and more reliable.

Figure 14:
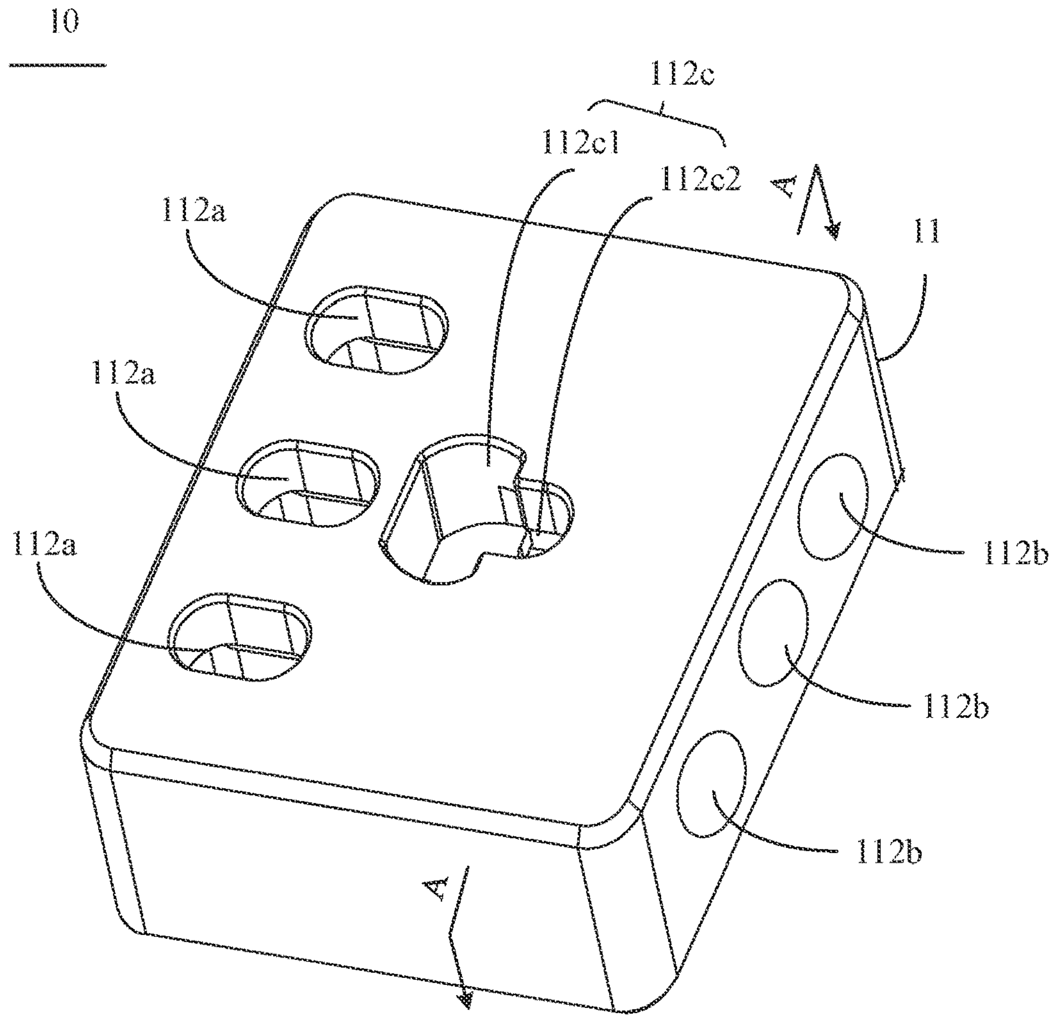
FIG. 14 shows a schematic diagram of the overall structure of the connection component provided in an example of this application.
Figure 15:
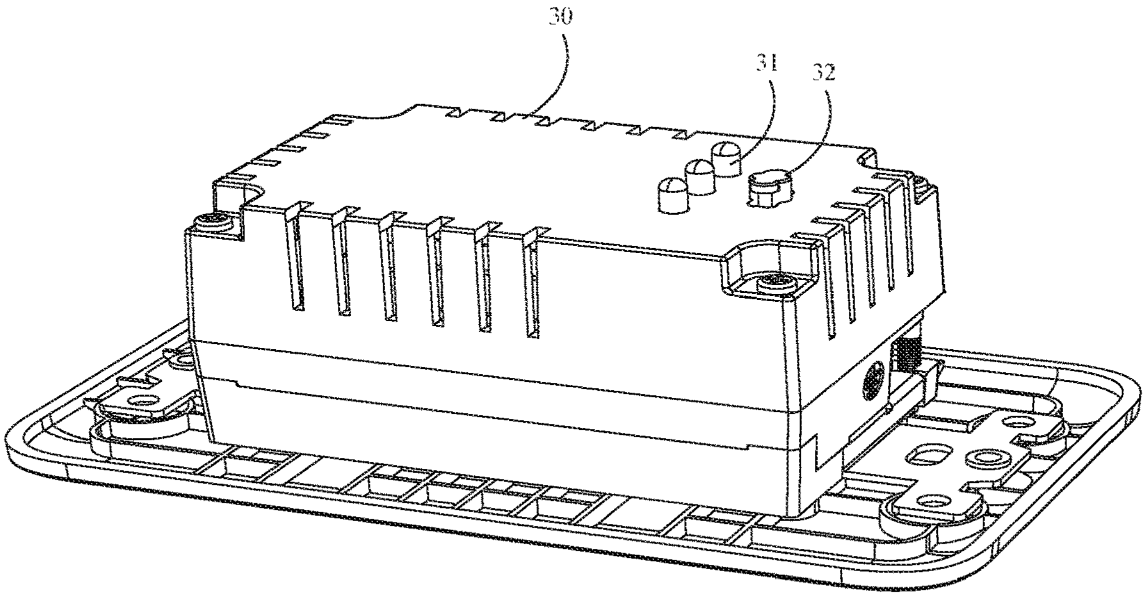
FIG. 15 shows a schematic diagram of the structure of the socket under the first vision provided in an example of this application.
Figure 16:
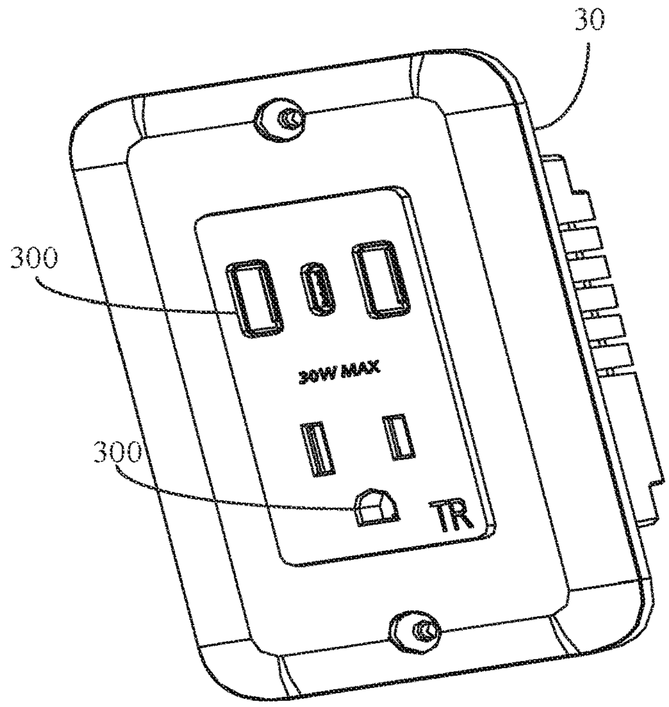
FIG. 16 shows a schematic diagram of the structure of the socket under the second vision provided in an example of this application.
Figure 17:
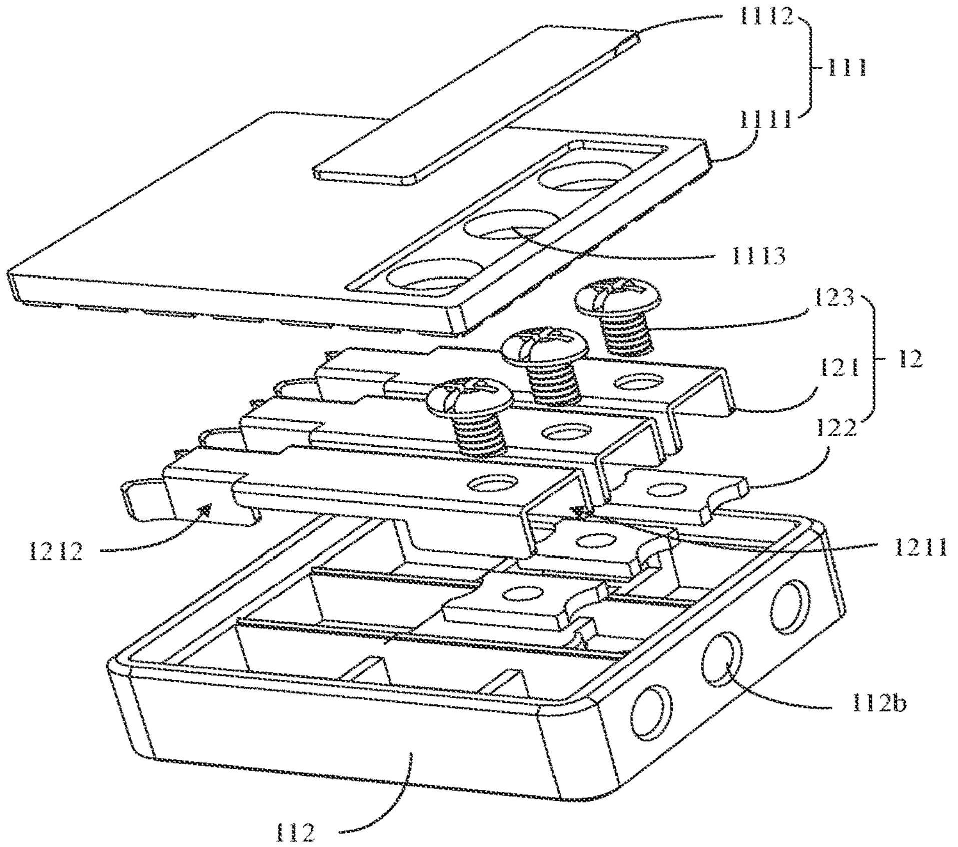
FIG. 17 shows a schematic diagram of the disassembly of the structure shown in FIG. 14 provided in an example of this application.
Figure 18:
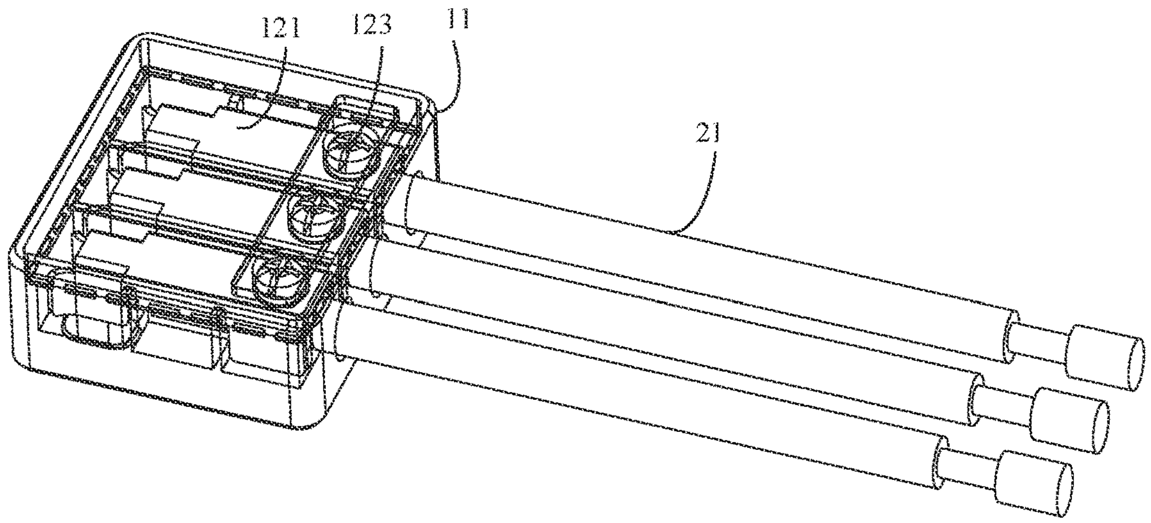
FIG. 18 shows a perspective view of the cable fixed on the connection component provided in an example of this application.

Please refer to FIGS. 14 to 18, where FIG. 14 shows a schematic diagram of the overall structure of the connecting component provided by an example of this application. FIG. 15 shows a schematic diagram of the structure of the base under the first vision provided by an example of this application. FIG. 16 shows a schematic diagram of the structure of the base under the second vision provided by an example of this application. FIG. 17 shows a schematic diagram of the disassembly of the structure shown in FIG. 14 provided by an example of this application. FIG. 18 shows a perspective view of the cable fixed on the connecting component provided by an example of this application. In the second example, a connecting component 10 is provided, which is used to fix the cable 21 and electrically connect with the cable 21, so that the socket 30 can achieve electrical connection with the cable 21 by contacting the connecting component 10, thereby achieving the installation of the socket 30.

The specific structure of the socket 30 can be seen in FIGS. 15 and 16. The socket 30 comprises a main body and a conductive column 31 and a fixing column 32 set on the main body; where, various electronic components are set in the main body to achieve corresponding functions, such as an AC alternating current module or a Type-A module. The conductive column 31 is electrically connected with the sub-components in the main body, the material of the conductive column 31 is specifically a conductive material, such as copper, used to contact the connecting component 10 to achieve electrical connection, the fixing column 32 is used to plug and fix with the connecting component 10, the material of the fixing column 32 is specifically an insulating material, such as plastic or rubber, etc. Specifically, the socket 30 can be an AC alternating current socket, a Type-A socket, a Type-A and Type-C compatible socket, a Type-C socket, or a Type-A and Type-C compatible socket.

Specifically, referring to FIG. 17, this connecting component 10 can comprise a shell 11 and several plug-in components 12.

The shell 11 has an accommodating cavity and a clearance hole 112*a* communicating with the accommodating cavity. The clearance hole 112*a* serves as a plug-in port. Several plug-in components 12 are set in the accommodating cavity of the shell 11, each plug-in component 12 is used to fix one end of the cable 21 and electrically connect with the cable 21, and at least part of the plug-in component 12 is exposed through the clearance hole 112*a*, so that the conductive column 31 of the socket 30 can be inserted into the clearance hole 112*a* to contact the plug-in component 12, thereby achieving electrical connection with the cable 21 through the plug-in component 12 of this connecting component 10, thereby achieving the installation of the socket 30. The structure of the cable 21 fixed on the plug-in component 12 can specifically refer to FIG. 18. Because this connecting component 10 can make the socket 30 insert into the clearance hole 112*a* to contact the plug-in component 12 in the accommodating cavity to achieve electrical connection with the cable 21, compared with the scheme in the existing technology where the cable 21 and the socket 30 are fixed to achieve their electrical connection, not only is the installation process simpler, but also in the disassembly process, the socket 30 can be directly pulled out from the accommodating cavity through the clearance hole 112*a* to disassemble the socket 30, thereby making the disassembly process simpler. At the same time, after the socket 30 is installed, even if there is electricity, users can replace the socket 30 with different function modules by themselves, such as replacing different function wall plug modules, without the need for professional operation, saving the corresponding costs. Because this connecting component 10 makes the installation and disassembly of the socket 30 simpler, it is more convenient to replace the socket 30 with different functions; in addition, because the contact point between the plug-in component 12 and the socket 30 is located in the accommodating cavity, and the two achieve the installation and disassembly of the socket 30 through the plug-in contact method, compared with the scheme where the contact point is located on the outer surface of the shell 11 or through manual wiring, the entire installation and disassembly process can be safer and more reliable.

The cable 21 can be a live wire, a neutral wire, or a ground wire; the cable 21, the plug-in component 12, and the conductive column 31 all correspond one to one; in specific examples, the number of the plug-in component 12 and the clearance hole 112*a* can both be three, the three plug-in components 12 are respectively used to fix one end of the live wire, the neutral wire, and the ground wire, and the three plug-in components 12 are set to correspond one to one with the three clearance holes 112*a* to expose through the corresponding clearance holes 112*a*. It can be understood that, in this example, the number of the conductive columns 31 on the socket 30 is also three, the three conductive columns 31 are inserted into the three clearance holes 112*a* respectively and contact the plug-in components 12 corresponding to the live wire, the neutral wire, and the ground wire respectively to achieve electrical connection.

In other examples, the number of clearance holes 112*a* can also be one, and all three plug-in components 12 are exposed vertically through this clearance hole 112*a*, so that the three conductive columns 31 on the socket 30 are inserted and contact the corresponding plug-in components 12 respectively to achieve electrical connection.

Referring to FIG. 17, each plug-in component 12 specifically comprises a first connecting piece 121, a second connecting piece 122, and a fixing piece 113.

The second connecting piece 122 is set opposite to at least part of the first connecting piece 121. The fixing piece 113 fixes the first connecting piece 121 and the second connecting piece 122 on the shell 11, and is used to fix one end of the cable 21 between the first connecting piece 121 and the second connecting piece 122, so that the cable 21 is electrically connected with the first connecting piece 121. The fixing piece 113 can be a screw column, and threads can be correspondingly set on the first connecting piece 121 and the second connecting piece 122, and the screw column is fixed on the shell 11 by screwing with the threads on the first connecting piece 121 and the second connecting piece 122. In the specific process of fixing the cable 21, for example, when the fixing member 123 is specifically a screw column, the screw column can be loosened first to make the screw column separate from the second connecting piece 122, then the cable 21 is inserted into the accommodating cavity and is located between the first connecting piece 121 and the second connecting piece 122, and is located at one end of the screw column facing the second connecting piece 122, and then the screw column is tightened, so as to fix the cable 21 between the first connecting piece 121 and the second connecting piece 122 and electrically connect with the first connecting piece 121.

The materials of the first connecting piece 121 and the second connecting piece 122 can both be conductive metal, such as copper. In specific examples, the length of the first connecting piece 121 is greater than the length of the second connecting piece 122, and the first end of the first connecting piece 121 is set opposite to the second connecting piece 122 and forms a limiting slot 1211, the second connecting piece 122 is set in the limiting slot 1211, after the cable 21 is fixed with the connecting component 10, one end of the cable 21 is specifically fixed between the second connecting piece 122 and the bottom wall of the limiting slot 1211. The second end of the first connecting piece 121 forms a conductive part 1212, and the conductive part 1212 is exposed through the clearance hole 112*a*, after the conductive column 31 of the socket 30 is inserted from the clearance hole 112*a*. It specifically contacts the conductive part 1212 of the first connecting piece 121, so as to achieve electrical connection with the cable 21 through the first connecting piece 121, thereby achieving the installation of the socket 30.

Figure 19:
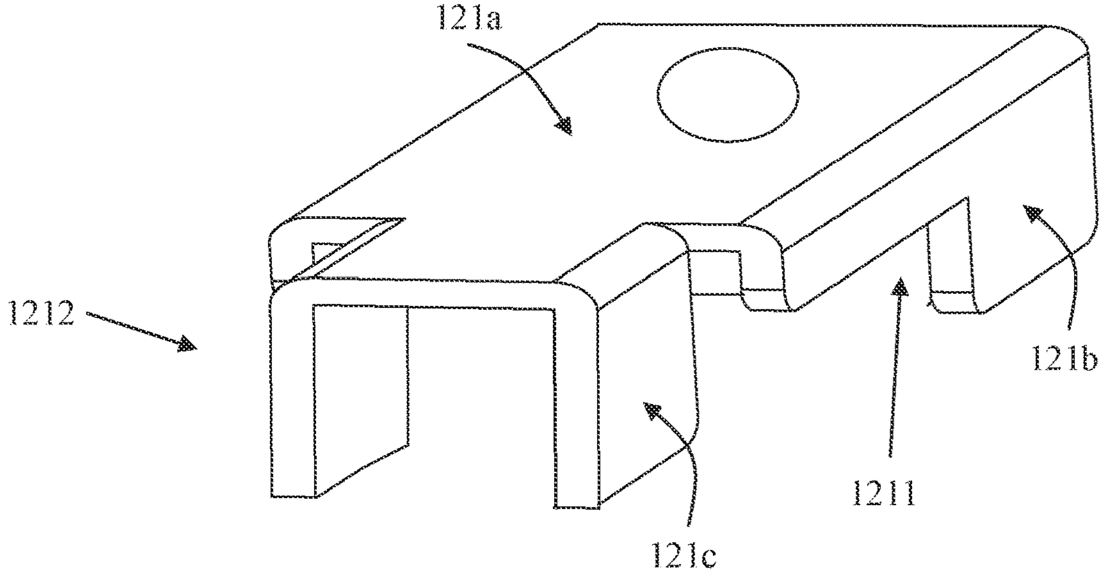
FIG. 19 shows a schematic diagram of the structure of the first connector provided in an example of this application.

In one example, referring to FIG. 19, FIG. 19 shows a schematic diagram of the structure of the first connecting piece provided by an example of this application. The first connecting piece 121 specifically comprises a metal base plate 121*a*, two first protruding ears 121*b*, and two second protruding ears 121*c*.

The metal base plate 121*a* can be a long strip-shaped base plate, and the long strip-shaped base plate has a first end and a second end set opposite to each other along its length direction. The two first protruding ears 121*b* are set opposite to each other along the width direction of the metal base plate 121*a* on the opposite sides of the first end of the metal base plate 121*a*, and are bent towards the clearance hole 112*a* side relative to the metal base plate 121*a*, to form a limiting slot 1211 in cooperation with the metal base plate 121*a*. It can be understood that this limiting slot 1211 is open in the axial direction and open in the lateral direction, and the lateral opening direction faces the second connecting piece 122.

Two second convex ears 121*c* are oppositely arranged along the width direction of the metal substrate 121*a* at the second end of the metal substrate 121*a*, and are bent towards the side of the avoidance hole 112*a* relative to the metal substrate 121*a*, to form a conductive part 1212 in cooperation with the metal substrate 121*a*. It can be understood that, in this example, the conductive part 1212 specifically forms a U-shaped groove, and the opening of the U-shaped groove faces the avoidance hole 112*a*, the conductive column 31 of the socket 30 specifically contacts the bottom wall of the U-shaped groove (i.e., the metal substrate 121*a*) and the adjacent two side walls to increase the contact area between the conductive column 31 and the first connector 121, ensuring that the conductive column 31 and the conductive part 1212 can effectively contact and achieve electrical connection. At the same time, the U-shaped groove can be used to clamp and limit the conductive column 31, preventing the conductive column 31 from moving relative to the first connector 121 and detaching from the first connector 121, causing the problem that the socket 30 cannot achieve electrical connection with the cable 21.

Figure 20:
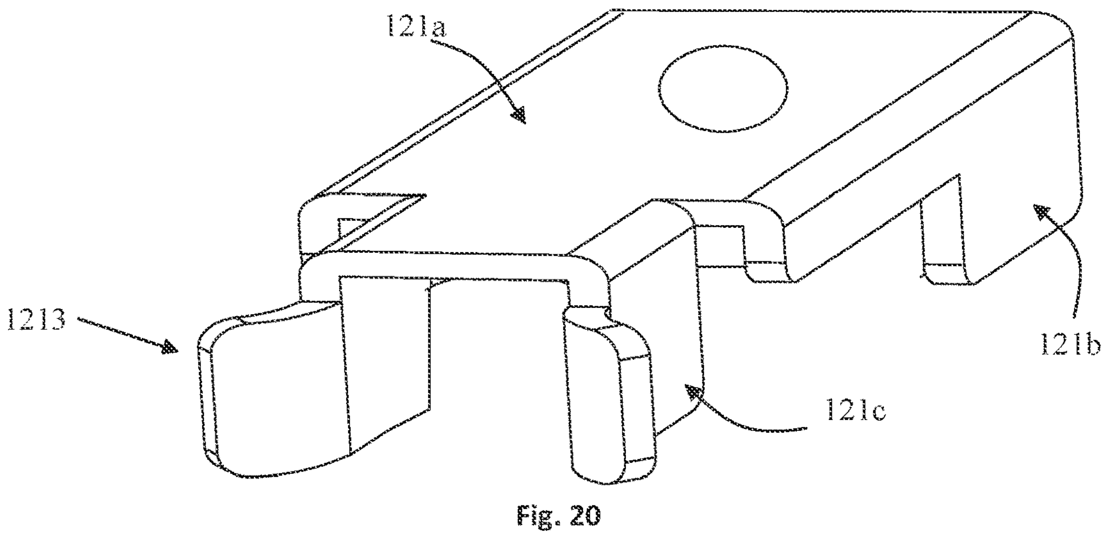
FIG. 20 shows a schematic diagram of the structure of the first connector provided in another example of this application.
Figure 21:
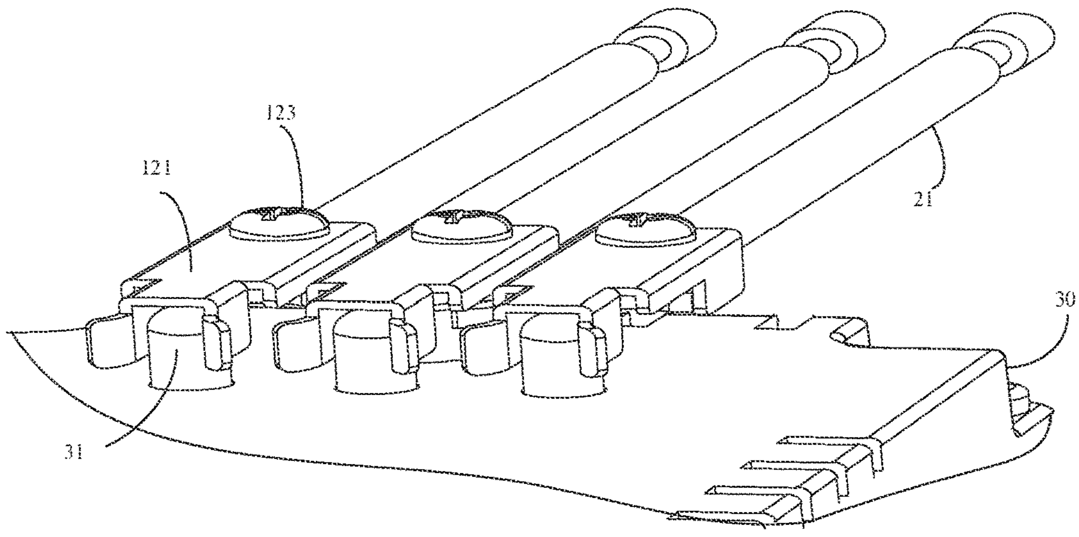
FIG. 21 shows a schematic diagram of the structure at the contact position of the conductive pillar of the socket and the first connector shown in FIG. 20 provided in an example of this application.

In a specific example, please refer to FIGS. 20 and 21, where FIG. 20 shows a schematic diagram of the structure of the first connector provided by another example of this application. FIG. 21 shows a schematic diagram of the structure at the contact position of the conductive column of the base provided by an example of this application and the first connector shown in FIG. 20. Two second protruding ears 121*c* extend towards the opposite sides away from one end of the limiting groove 1211, that is, one end of the two second protruding ears 121*c* away from the limiting groove 1211, the distance between the two second protruding ears 121*c* gradually increases in the direction away from the limiting groove 1211, to form a guiding part 1213, for guiding the conductive column 31 of the socket 30 inserted from the clearance hole 112*a* to the inside of the conductive part 1212, to facilitate the insertion of the conductive column 31 into the conductive part 1212; specifically, in the specific application process, after the socket 30 is inserted into the clearance hole 112*a*, it is first set corresponding to the guiding part 1213, then the socket 30 is slid to make the socket 30 slide from the guiding part 1213 to the conductive part 1212, compared to the scheme of directly inserting the socket 30 into the U-shaped groove of the conductive part 1212 to achieve contact with the conductive part 1212, it can reduce the operation difficulty of inserting the conductive column 31 into the conductive part 1212, and can avoid the problem of damage to the conductive part 1212 by the conductive column 31 due to the smaller diameter of the U-shaped groove of the conductive part 1212 facing the clearance hole 112*a*. Specifically, in this example, the specific structure after the conductive column 31 of the socket 30 contacts the conductive part 1212 can be seen in FIG. 21.

Specifically, the parts of the two second protruding ears 121*c* that form the guiding part 1213 can specifically be arc-shaped to facilitate sliding.

Figure 22:
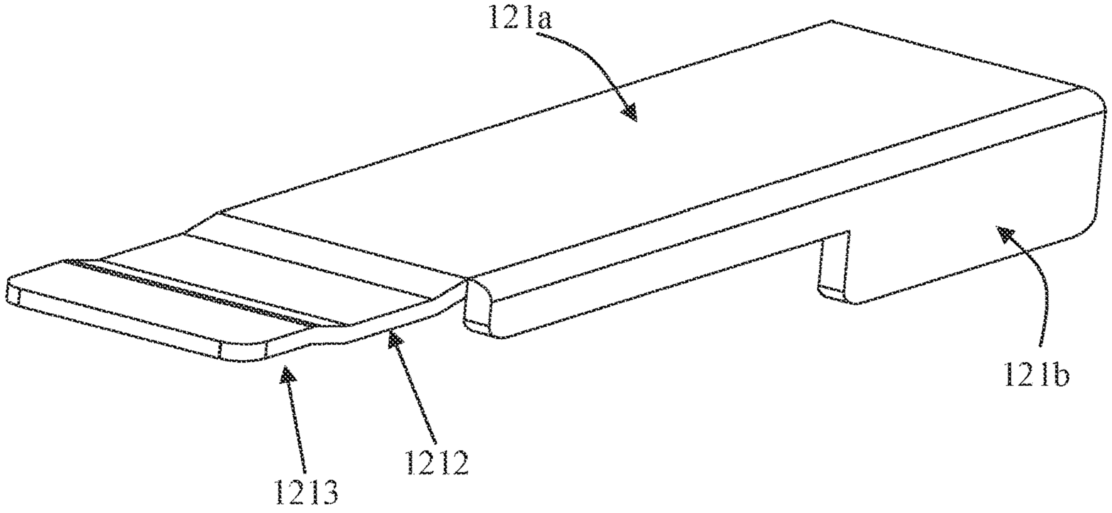
FIG. 22 shows a schematic diagram of the structure of the first connector provided in another example of this application.
Figure 23:
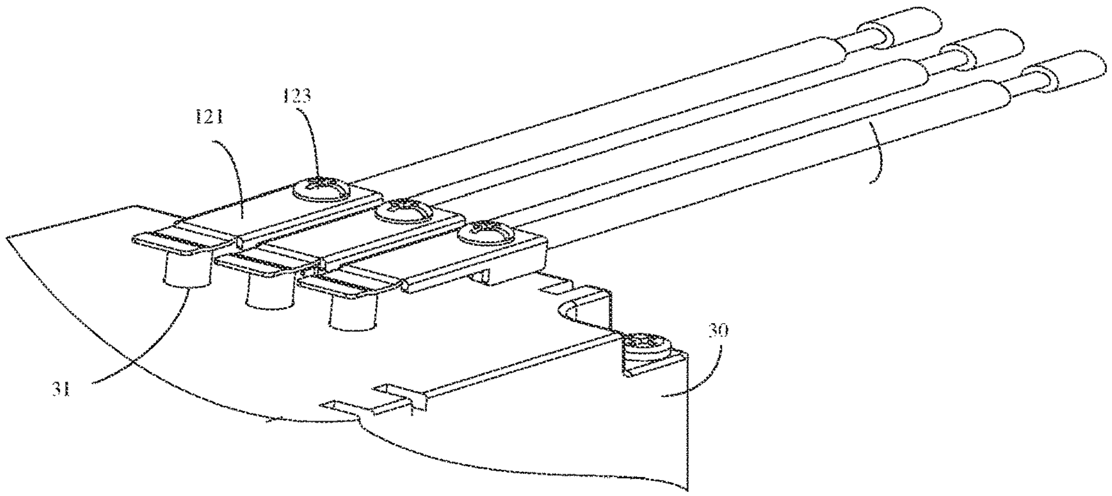
FIG. 23 shows a schematic diagram of the structure at the contact position of the conductive pillar of the socket and the first connector shown in FIG. 22 provided in an example of this application.
Figure 24:
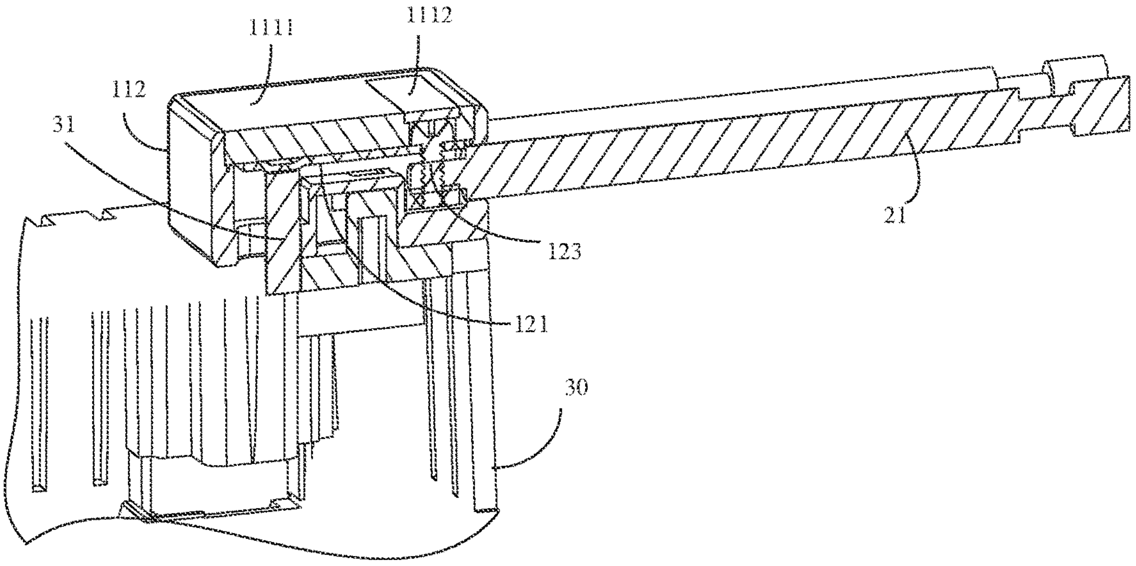
FIG. 24 shows a sectional view of the structure at the contact position of the socket and the first connector shown in FIG. 23 provided in an example of this application.

Please refer to FIGS. 22 to 24, where FIG. 22 shows a schematic diagram of the structure of the first connector provided by another example of this application. FIG. 23 shows a schematic diagram of the structure at the contact position of the conductive column of the base provided by an example of this application and the first connector shown in FIG. 22. FIG. 24 shows a cross-sectional view of the contact position of the base and the first connector shown in FIG. 23 provided by an example of this application. In another example, the first connector 121 can specifically comprise a metal substrate 121*a* and two first protruding ears 121*b*.

The metal substrate 121*a* can be a long strip-shaped substrate, the long strip-shaped substrate has a first end and a second end set opposite each other along its length direction; the two first protruding ears 121*b* are set opposite each other along the width direction of the metal substrate 121*a* on the opposite sides of the first end of the metal substrate 121*a*, and extend towards the side of the clearance hole 112*a* relative to the metal substrate 121*a*, to form a limiting groove 1211 in cooperation with the metal substrate 121*a*. It can be understood that this limiting groove 1211 is open in the axial direction and laterally, and the lateral opening direction faces the second connector 122.

The second end of the metal substrate 121*a* itself forms interconnected conductive part 1212 and guiding part 1213. The conductive part 1212 protrudes towards the clearance hole 112*a*, to ensure that the conductive column 31 of the socket 30 can effectively contact the protruding conductive part 1212 after being inserted into the clearance hole 112*a*, thereby achieving electrical connection with the cable 21. The guiding part 1213 is located on the side of the conductive part 1212 away from the limiting groove 1211, and in this example, refer to FIG. 24, the vertical distance from the conductive part 1212 to the plane where the clearance hole 112*a* is located is less than the vertical distance from the guiding part 1213 to the plane where the clearance hole 112*a* is located, the conductive column 31 of the socket 30 is set corresponding to the guiding part 1213 after being inserted into the clearance hole 112*a* and can slide along the guiding part 1213 to the position of the conductive part 1212, to ensure that the conductive part 1212 can effectively contact the conductive column 31, thereby achieving electrical connection with the cable 21. Specifically, in this example, the specific structure after the conductive column 31 of the socket 30 contacts the conductive part 1212 can be seen in FIGS. 23 and 24.

In a specific example, refer to FIG. 1, the shell 11 also has a fixing groove 112*c*, for interlocking and fixing with the fixing column 32 of the socket 30; specifically, a fixing column 32 is set on the socket 30, after the conductive column 31 of the socket 30 is inserted into the clearance hole 112*a*, the fixing column 32 extends into the fixing groove 112*c*, then the socket 30 is slid, so that the conductive column 31 of the socket 30 contacts the conductive part 1212 of the first connector 121, and the fixing column 32 of the socket 30 slides to the fixing groove 112*c* for interlocking and fixing, to achieve the fixed installation of the socket 30 and the electrical connection with the cable 21.

Figure 25:
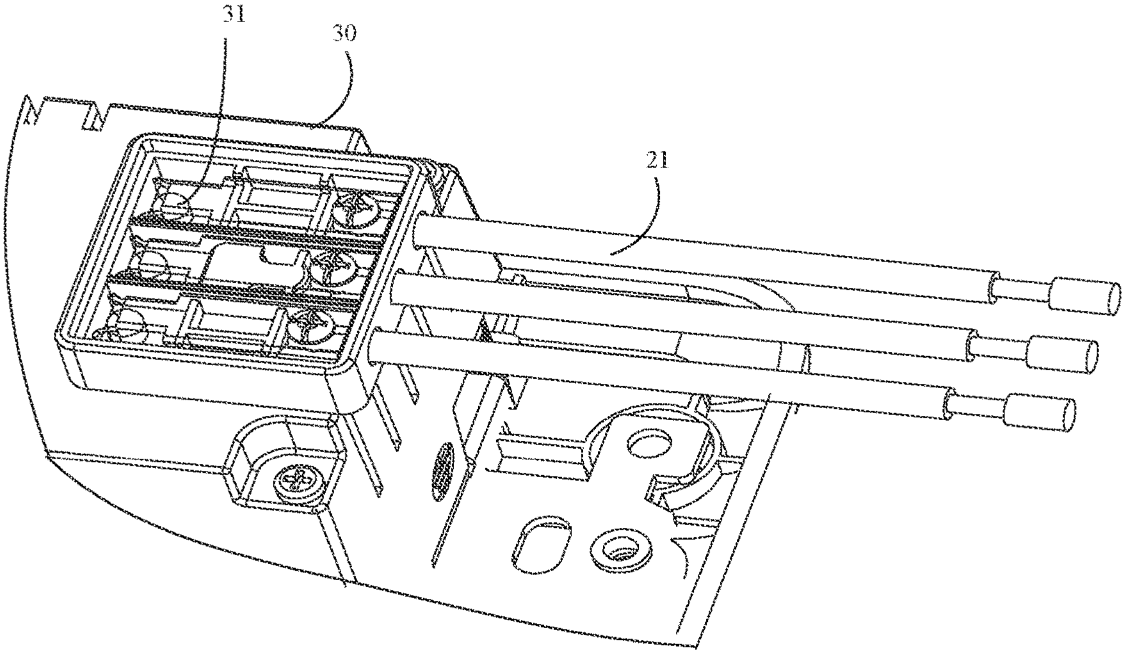
FIG. 25 shows a schematic diagram of the structure when the socket is fixedly inserted into the connection component provided in an example of this application.
Figure 26:
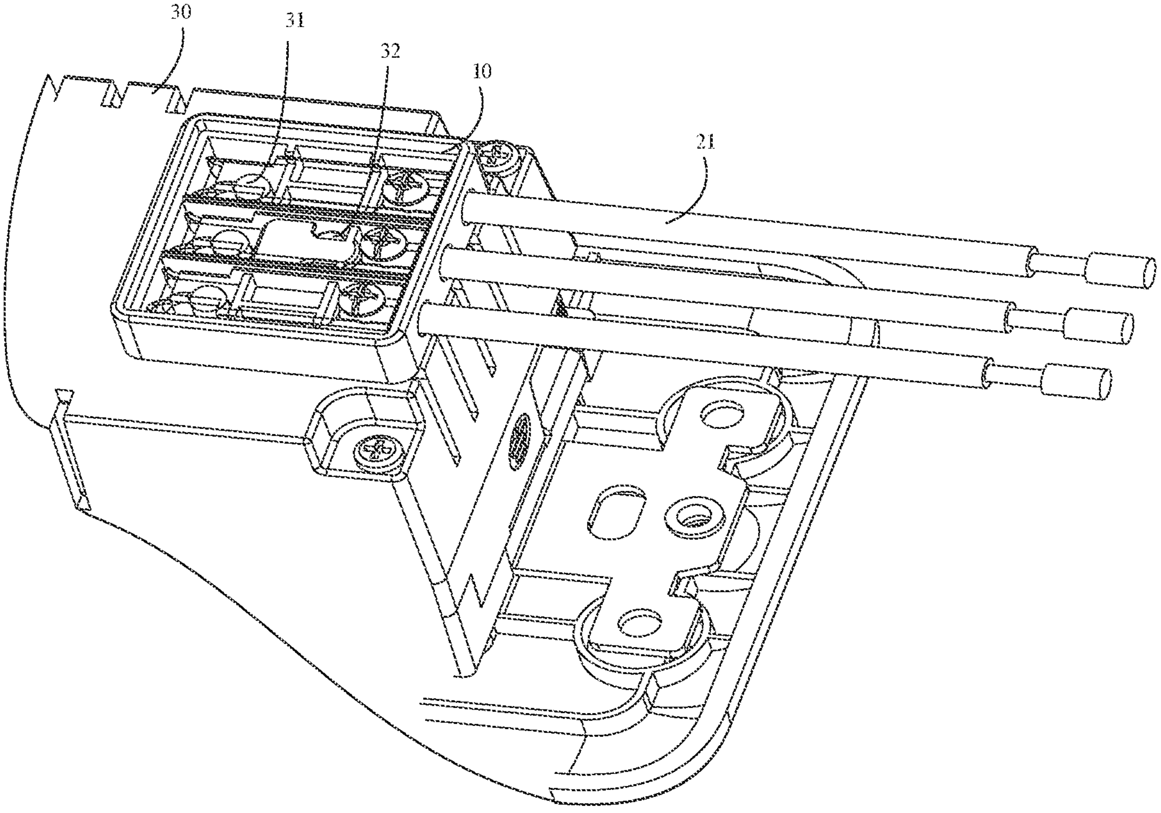
FIG. 26 shows a schematic diagram of the structure after the fixing column of the socket and the second slot body are fixedly snapped provided in an example of this application.

Specifically, refer to FIGS. 1, 25, and 26, where FIG. 25 shows a schematic diagram of the structure when the fixed column of the base provided by an example of this application is inserted into the connector. FIG. 26 shows a schematic diagram of the structure after the fixed column of the base provided by an example of this application is interlocked and fixed with the second groove body. The fixing groove 112*c* can specifically comprise interconnected first groove body 112*cl* and second groove body 112*c*2. The width dimension of the first groove body 112*cl* is larger than the width dimension of the second groove body 112*c*2, after the fixing column 32 of the socket 30 extends into the fixing groove 112*c*, it is set corresponding to the first groove body 112*cl* (refer to FIG. 25), then slides to the second groove body 112*c*2 to interlock and fix with the second groove body 112*c*2 (refer to FIG. 26). When the fixing column 32 of the socket 30 is inserted into the first groove body 112*c*1, the conductive column 31 of the socket 30 is inserted from the clearance hole 112*a* and set corresponding to the guiding part 1213. When the fixing column 32 of the socket 30 slides from the first groove body 112*cl* to the second groove body 112*c*2, the conductive column 31 of the socket 30 slides along the guiding part 1213 to the position of the conductive part 1212, thereby achieving the interlocking and fixing of the two through the insertion of the fixing column 32 into the fixing groove 112*c*, and achieving the electrical connection of the socket 30 and the cable 21 through the contact of the conductive column 31 and the conductive part 1212 of the first connector 121.

In this, refer to FIG. 17, the shell 11 specifically comprises an upper shell 111 and a lower shell 112.

The lower shell 112 has a plurality of accommodating grooves 112*d* that are insulated from each other and spaced apart, a plurality of wiring components 12 are embedded in the plurality of accommodating grooves 112*d*, and correspond to the plurality of accommodating grooves 112*d* one by one, that is, one wiring component 12 is embedded in one accommodating groove 112*d*. And each accommodating groove 112*d* has a threading hole 112*b* on its side wall, to allow the cable 21 to extend into the accommodating groove 112*d* through the threading hole 112*b* and be fixed with the wiring component 12.

Figure 27:
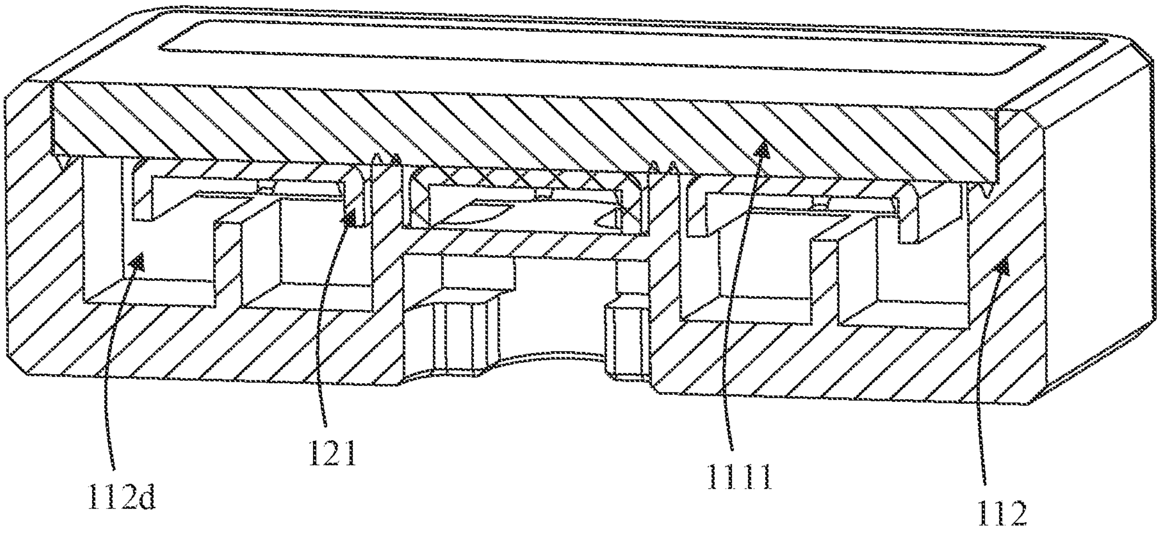
FIG. 27 shows a schematic diagram of the A-A cross-section of the structure shown in FIG. 14 provided in an example of this application.

In a specific example, the number of accommodating grooves 112*d* is consistent with the number of wiring components 12, which can also be three, the live wire, neutral wire, and ground wire respectively extend into the accommodating groove 112*d* through the threading hole 112*b* corresponding to the accommodating groove 112*d* to be fixed with the wiring component 12 in the current accommodating groove 112*d* and achieve electrical connection; and refer to FIG. 27. FIG. 27 shows a schematic diagram of the cross-section in the A-A direction of the structure shown in FIG. 14 provided by an example of this application. Specifically, the complete isolation between two adjacent wiring components 12 can be achieved by double ultrasonic complete insulation isolation between two adjacent accommodating grooves 112*d*, to avoid the problem of short circuit.

Specifically, refer to FIG. 17, the lower shell 112 comprises a bottom wall, an annular side wall, and a plurality of partitions, the plurality of partitions divide the interior space of the lower shell 112 into a plurality of accommodating grooves 112*d*. The annular side wall is specifically rectangular, the threading hole 112*b* is specifically set on the annular side wall, and refer to FIG. 17, three threading holes 112*b* can be located on the same side edge of the annular side wall. The end of the bottom wall near the threading hole 112*b* can be provided with a mounting seat, the wiring component 12 is specifically mounted on the mounting seat. In a specific example, a threaded hole can be provided on the mounting seat, to achieve the installation and fixation of the two through a threaded column. Specifically, the clearance hole 112*a* and the fixing groove 112*c* can both be opened in the bottom wall of the lower shell 112, and the clearance hole 112*a* can be located at the end of the bottom wall away from the threading hole 112*b*. In a specific example, the number of clearance holes 112*a* can correspond one-to-one with the number of wiring components 12, for example, there can be three; the fixing groove 112*c* can be set at other positions on the bottom wall different from the clearance hole 112*a*, and the fixing groove 112*c* does not communicate with the accommodating groove 112*d*, the opening of the fixing groove 112*c* faces the direction away from the accommodating groove 112*d*.

The upper shell 111 is specifically covered on the lower shell 112, and forms an accommodating cavity in cooperation with a plurality of accommodating grooves 112*d*.

In a specific example, refer to FIG. 17, the upper shell 111 can specifically comprise a panel 1111 and a cover 1112. The panel 1111 is covered on the lower shell 112, and the panel 1111 has a plurality of through holes 1113, the plurality of through holes 1113 correspond one-to-one with the plurality of accommodating grooves 112*d*, to allow the fixing parts 113 of the wiring components 12 to be exposed through the through holes 1113, so that in the specific use process, after the panel 1111 and the lower shell 112 are installed, the fixing parts 113 can be twisted through the through hole 1113, to fix the cable 21 between the first connector 121 and the second connector 122 or to remove the cable 21 from between the first connector 121 and the second connector 122 through the through hole 1113, compared to the scheme of removing the entire upper shell 111 to install or remove the cable 21, it can improve the operation safety, and can save the removal and installation process of the panel 1111 during the cable 21 fixing process, making the entire operation process simpler.

In other examples, the number of through holes 1113 can also be one, and several fixtures 113 in the placement slot 112*d* can all be exposed through the through hole 1113. This example does not limit this, as long as the fixtures 113 of the wiring component 12 can be exposed, it is convenient to twist the fixtures 113 outside the shell 11.

The cover 1112 is covered on the surface of the panel 1111 away from the lower shell 112, used to block several through holes 1113; in specific examples, the surface of the panel 1111 away from the lower shell 112, and corresponding to the position of several through holes 1113, a receiving slot is formed, several through holes 1113 are located at the bottom of the receiving slot, and are connected with the bottom of the receiving slot, the cover 1112 is specifically embedded in the receiving slot to block several through holes 1113. And the surface of the insulating substrate away from the through hole 1113 can be flush with the surface of the panel 1111 away from the lower shell 112, to make the surface of the upper shell 111 smooth. The material of the cover 1112 can be insulating material, such as plastic or rubber, to play a certain insulating role.

In specific examples, the cover 1112 is fixed to the panel 1111 by means of adhesive, ultrasonic or buckle. For example, the bottom of the receiving slot can form a protrusion different from the position of several through holes 1113, the cover 1112 forms a recess at the position corresponding to the protrusion, after the cover 1112 is embedded in the receiving slot, the protrusion is buckled into the recess, to fix the insulating substrate in the receiving slot.

In specific examples, to facilitate the removal of the insulating substrate from the panel 1111, a hook ring can also be set on the surface of the insulating substrate away from the through hole 1113, to pull out the insulating panel 1111 from the receiving slot by applying force on the hook ring. Specifically, a storage slot can also be formed on the surface of the insulating substrate away from the through hole 1113, the hook ring can specifically be stored in the storage slot, and the hook ring can be configured between the first state and the second state; specifically, when the hook ring is in the first state, the hook ring is located in the storage slot, to save space, when the hook ring is in the second state, the hook ring is located outside the storage slot, so that the user can plug and unplug the insulating substrate from the receiving slot through the hook ring.

The provided connector component 10 can fix and electrically connect the cable 21, thereby enabling the socket 30 to achieve electrical connection with the cable 21 through the connector component 10, and allowing the socket 30 to be fixed and electrically connected to the connector component 10 in a pluggable manner, thus even after the socket 30 and the cable 21 have been installed and electrically connected, different functional sockets 30 can be replaced more conveniently, and in the whole process, there is no need to replace the electrified part, that is, there is no need to use other cables 21 to communicate with the power supply when using other functional sockets 30. At the same time, because the connector component 10 facilitates the replacement of the socket 30, the socket 30 can be a single-function socket 30, and when other functional sockets 30 are needed, the current socket 30 can be replaced to meet user needs, compared with the existing technology, in order to improve the current wall plug function, the scheme of setting multiple functional modules on the same socket 30 greatly reduces the footprint and spatial volume of the socket 30, making the space occupancy rate of the entire wall plug smaller, effectively improving user satisfaction with the experience.

The connector component 10 provided in this example is set up with a shell 11, and the shell 11 has a placement cavity and an avoidance hole 112*a* communicating with the placement cavity; at the same time, several wiring components 12 are set up to fix one end of the cable 21 and electrically connect with the cable 21 through the wiring components 12. In addition, several wiring components 12 are set in the placement cavity, and at least part of the wiring components 12 are exposed through the avoidance hole 112*a*, so that the conductive column 31 of the socket 30 can be inserted into the avoidance hole 112*a* to contact the wiring component 12, thus enabling the socket 30 to achieve electrical connection with the cable 21 through the wiring component 12 of the connector component 10, and then achieving the installation of the socket 30; wherein, since the connector component 10 can enable the socket 30 to insert into the avoidance hole 112*a* to contact the wiring component 12 in the placement cavity to achieve electrical connection with the cable 21, compared with the scheme in the existing technology to fix the cable 21 and the socket 30 to achieve their electrical connection, not only the installation process is simpler, but also in the disassembly process, the socket 30 can be pulled out directly from the placement cavity through the avoidance hole 112*a* to disassemble the socket 30, thus making the disassembly process also simpler. And since the connector component 10 makes the installation and disassembly of the socket 30 simpler, it is convenient to replace different functional sockets 30; in addition, since the contact point between the wiring component 12 and the socket 30 is located in the placement cavity, and the installation and disassembly of the socket 30 are achieved through the plug-in contact method, compared with the scheme where the contact point is located on the outer surface of the shell 11 or through manual wiring, the entire installation and disassembly process can be more safe and reliable.

Figure 28:
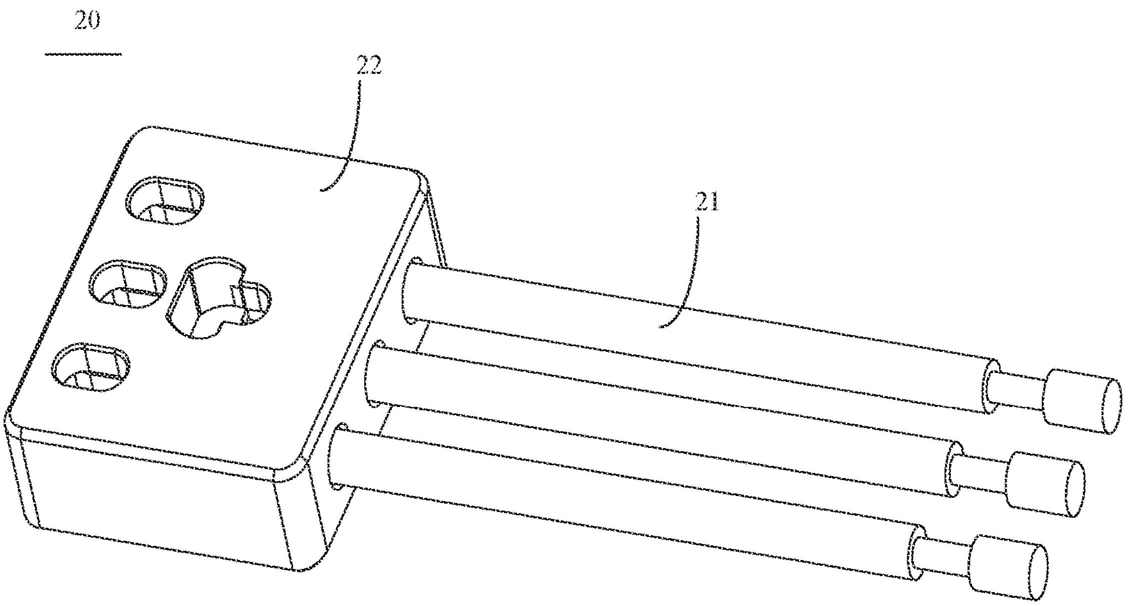
FIG. 28 shows a schematic diagram of the overall structure of the cable plug provided in an example of this application.
Figure 29:
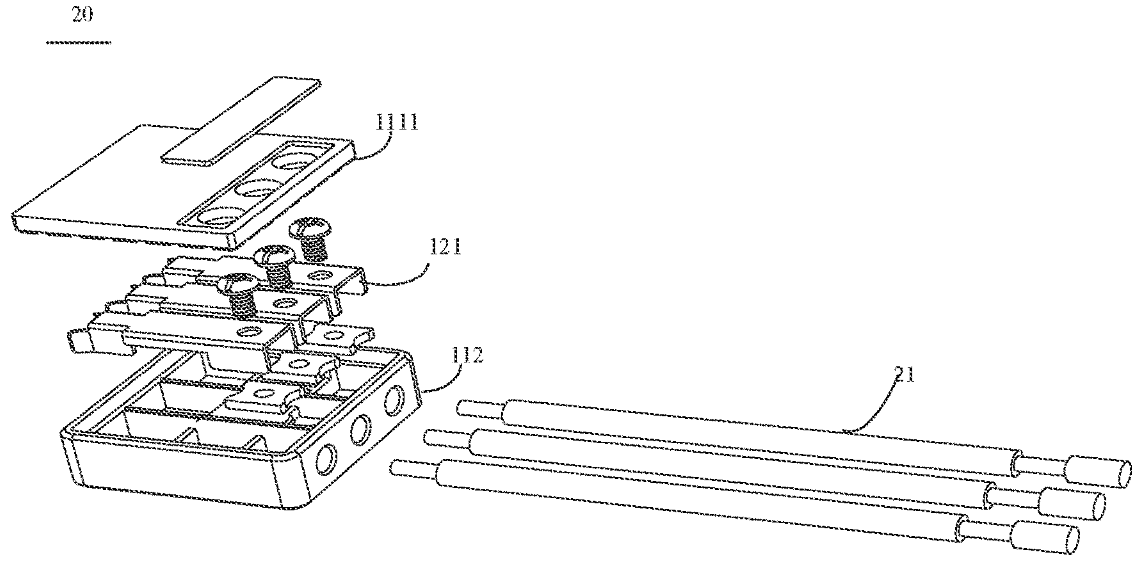
FIG. 29 shows a schematic diagram of the disassembly of the structure shown in FIG. 28 provided in an example of this application.

Please refer to FIGS. 28 and 29, where FIG. 28 shows a schematic diagram of the overall structure of the cable plug provided by an example of this application. FIG. 29 shows a schematic diagram of the disassembly of the structure shown in FIG. 28 provided by an example of this application. In the second example, a cable plug 20 is provided. The cable plug 20 may include: a cable 21 and a connection component 22. The cable 21 can be a live wire, neutral wire, or ground wire; the connection component 22 is used to fix one end of the cable 21 and electrically connect with the cable 21. And the connection component 22 can specifically be the connection component 10 provided by the second example. The specific structure and function of the connection component 10 and the connection and fixation relationship with the cable 21 can be referred to the above text description, which is not repeated here.

In a specific example, the number of cables 21 can be three, the three cables 21 are respectively a live wire, neutral wire, and ground wire. The connection component 22 can specifically include three plug-in components 12, the three plug-in components 12 are respectively used to fix the live wire, neutral wire, and ground wire and electrically connect with them, and the specific fixation method can be referred to the above text description, which is not repeated here.

The cable plug 20 provided by this example, by setting up the cable 21 and connection component 22, and setting the connection component 22 to include a shell 11, makes the shell 11 have a housing cavity and an avoidance hole 112*a* communicating with the housing cavity. At the same time, by setting several plug-in components 12, to fix one end of the cable 21 and electrically connect with the cable 21 through the plug-in components 12. In addition, by setting several plug-in components 12 in the housing cavity, and exposing at least part of the plug-in components 12 through the avoidance hole 112*a*, so that the conductive column 31 of the socket 30 can be inserted into the avoidance hole 112*a* to contact the plug-in components 12, thereby enabling the socket 30 to achieve electrical connection with the cable 21 through the plug-in components 12 of the connection component 22, and thus achieving the installation of the socket 30. Since the connection component 22 can enable the socket 30 to insert into the avoidance hole 112*a* to contact the plug-in components 12 in the housing cavity to achieve electrical connection with the cable 21, compared with the scheme of fixing the cable 21 and the socket 30 in the prior art to achieve electrical connection between the two, not only the installation process is simpler, but also in the disassembly process, the socket 30 can be directly pulled out from the housing cavity through the avoidance hole 112*a* to disassemble the socket 30, thus making the disassembly process also simpler; and because the connection component 22 makes the installation and disassembly of the socket 30 simpler, it is convenient to replace the socket 30 with different functions; in addition, since the contact point between the plug-in component 12 and the socket 30 is located in the housing cavity, and the installation and disassembly of the socket 30 are achieved by the way of plug-in contact, compared with the scheme of the contact point located on the outer surface of the shell 11 or manual wiring, the whole installation and disassembly process can be safer and more reliable.

Figure 30:
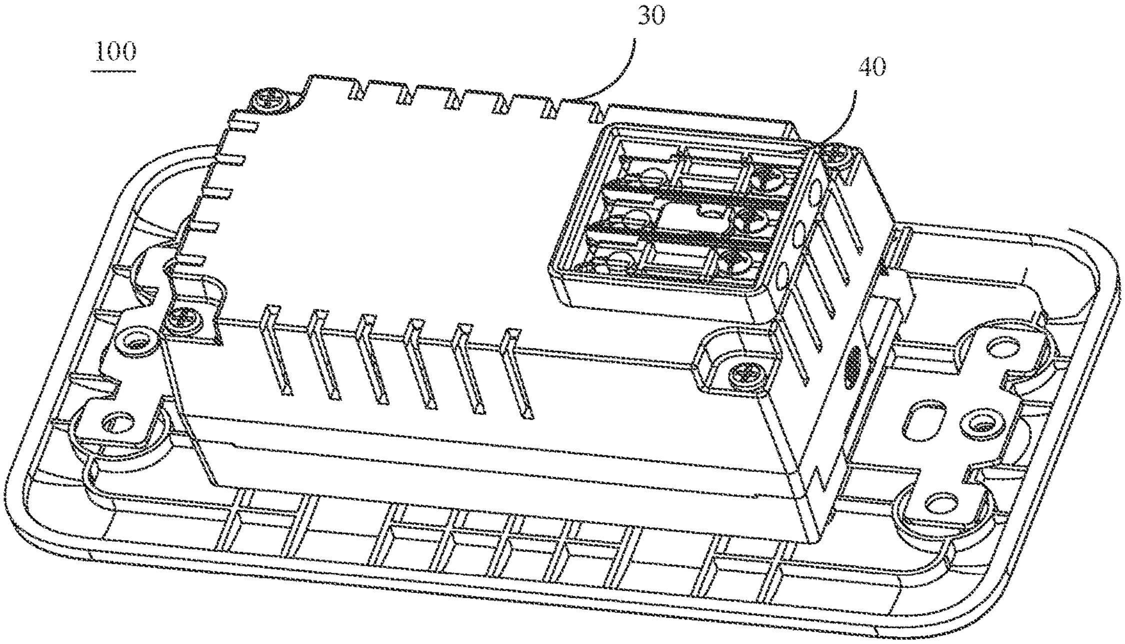
FIG. 30 shows a schematic diagram of the structure of the cable assembly provided in an example of this application.
Figure 31:
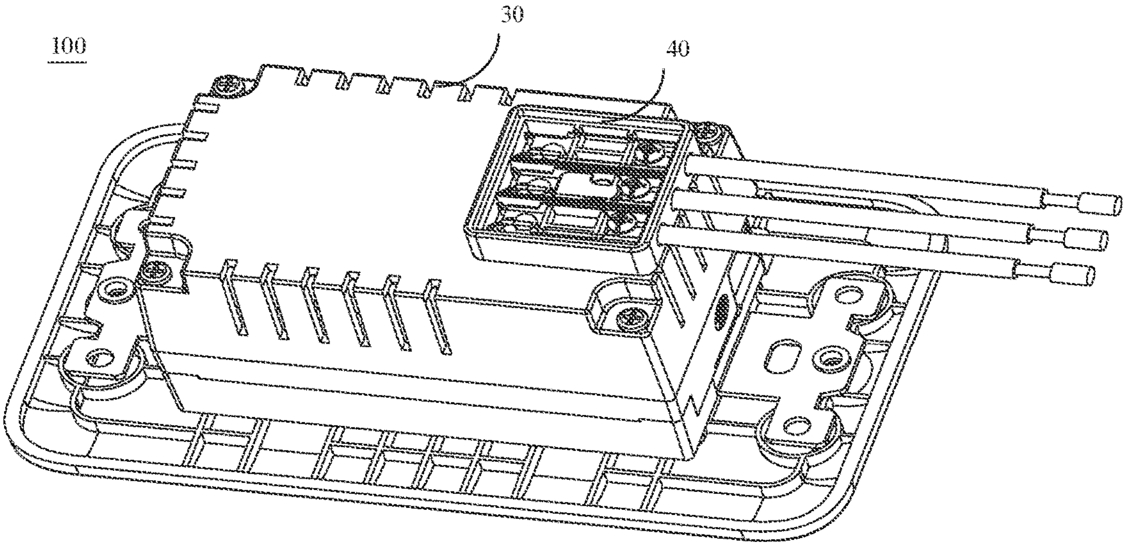
FIG. 31 shows a schematic diagram of the structure of the cable assembly provided in another example of this application.

Please refer to FIGS. 30 to 31, where FIG. 30 shows a schematic diagram of the structure of a cable assembly provided by an example of this application. FIG. 31 shows a schematic diagram of the structure of a cable assembly provided by another example of this application; In the second example, a cable assembly 100 is provided, which specifically may include a socket 30 and a connector 40. The connector 40 can be the connection component 10 provided in the above-mentioned second example. Specifically, in this example, the specific structure of the cable assembly 100 can be seen in FIG. 30; of course, the connector 40 can also be the cable plug 20 provided in the above-mentioned second example. Specifically, in this example, the specific structure of the cable assembly 100 can be seen in FIG. 31.

Referring to FIG. 16, the socket 30 has a first end face and a second end face different from the first end face. The first end face of the socket 30 has at least one electrical socket 300 for the insertion of an external device's electrical plug, and the second end face has a conductive column 31 to achieve electrical connection with the connector 40 through the conductive column 31; specifically, the conductive column 31 of the socket 30 can be inserted into the avoidance hole 112*a* of the connection component 10 to electrically connect with the connection component 10, or inserted into the avoidance hole 112*a* of the cable plug 20 to electrically connect with the cable plug 20, thereby connecting with the power supply through the connection component 10 and the cable 21 to supply power to the socket 30; the specific plan for the conductive column 31 of the socket 30 to achieve electrical connection with the connection component 10 or the cable plug 20 can be referred to the above text, and can achieve the same or similar technical effects, which will not be repeated here.

Specifically, the second end face of the socket 30 can also have a fixed column 32, and the socket 30 and the connector 40 are plugged and connected through this fixed column 32 and the fixed slot 112*c* on the connector 40 to achieve their relative fixation; the specific structure and function of the fixed column 32 and the fixed slot 112*c* and their plug and connection can be referred to the above text, and can achieve the same or similar technical effects, which will not be repeated here.

Specifically, the first end face and the second end face of the socket 30 can be set back to back, and the first end face of the socket 30 can set an electrical socket 300 of one function, such as a triangular hole. In specific examples, the socket 30 can be an AC power socket, a Type-A socket, a Type-A and Type-C compatible socket, a Type-C socket, or a Type-A and Type-C compatible socket.

The cable assembly 100 provided in this example, by setting up the socket 30 and the connector 40, where the connector 40 can specifically be the connection component 10 or the cable plug 20 involved in the above example; the cable assembly 100 is powered by setting up an electrical socket 300 on the first end face of the socket 30 for the insertion of an electrical plug, and setting up a conductive column 31 on the second end face of the socket 30, so that the conductive column 31 of the socket 30 can be inserted into the avoidance hole 112*a* of the connection component 10 to electrically connect with the connection component 10, or inserted into the avoidance hole 112*a* of the cable plug 20 to electrically connect with the cable plug 20, thereby supplying power to the socket 30; at the same time, by setting up several plug-in components 12 on the connection component 10, to fix one end of the cable 21 and electrically connect with the cable 21 through the plug-in components 12. In addition, by setting several plug-in components 12 in the accommodating cavity of the connection component 10, and exposing at least part of the plug-in components 12 through the avoidance hole 112*a*, so that the conductive column 31 of the socket 30 can be inserted into the avoidance hole 112*a* to contact the plug-in components 12, thereby enabling the socket 30 to electrically connect with the cable 21 through the plug-in components 12 of the connection component 10, and then achieving the installation of the socket 30. Since the connection component 10 can enable the socket 30 to insert into the avoidance hole 112*a* to contact the plug-in components 12 in the accommodating cavity to achieve electrical connection with the cable 21, compared with the solution in the prior art of fixing the cable 21 and the socket 30 to achieve their electrical connection, not only is the installation process simpler, but also in the disassembly process, the socket 30 can be directly pulled out from the accommodating cavity through the avoidance hole 112*a* to disassemble the socket 30, thus making the disassembly process also simpler. And because the connection component 10 makes the installation and disassembly of the socket 30 simpler, it is convenient to replace the socket 30 with different functions. Moreover, since the contact point between the plug-in component 12 and the socket 30 is located in the accommodating cavity, and the installation and disassembly of the socket 30 are achieved by the way of plug and contact, compared with the solution where the contact point is located on the outer surface of the shell 11 or through manual wiring, the whole installation and disassembly process can be safer and more reliable.

The above are only examples of this application and do not limit the patent scope of this application. Any equivalent structure or equivalent process change made using the content of this application specification and drawings, or directly or indirectly applied in other related technical fields, are similarly included within the patent protection scope of this application.

What is claimed is:

1. A connection device comprising:

a shell comprising a cavity and an insertion port; and a plurality of plug-in components in the cavity, wherein each of the plurality of plug-in components is configured to electrically connect with a cable, wherein at least part of the plurality of plug-in components are exposed via the insertion port, and wherein the shell comprises:

a lower shell comprising a plurality of accommodating slots and a through hole, wherein each of the plurality of plug-in components is embedded in a respective one of the plurality of accommodating slots, and each one of the plurality of accommodating slots has a threading hole; and an upper shell, covering the lower shell, and forming the insertion port with the through hole, and forming the cavity with the plurality of accommodating slots.

2. The connection device according to claim 1, wherein:

the shell comprises a card slot that serves as the insertion port; and at least part of the plurality of plug-in components protrude from the cavity and are located in the card slot.

3. The connection device according to claim 1, wherein each of the plurality of plug-in components comprises:

a first connector;

a second connector, wherein at least part of the second connector is opposite to the first connector; and a screw configured to fix the first connector and the second connector on the shell, and is configured to fix one end of the cable between the first connector and the second connector to electrically connect with the first connector.

4. The connection device according to claim 3, wherein:

a length of the first connector is greater than a length of the second connector, a first end of the first connector is set opposite to the second connector and forms a limiting slot, and the second connector is set in the limiting slot, so as to fix one end of the cable between the second connector and a bottom wall of the limiting slot.

5. The connection device according to claim 1, wherein an end of one of the plurality of accommodating slots far away from the respective threading hole has a common side wall with the through hole, each of the plurality of plug-in components comprises a first connector, an end of the first connector extends into the through hole and bends in a direction away from the upper shell to form a conductive part, and the conductive part is set on a side surface of the common side wall towards the insertion port.

6. The connection device according to claim 5, wherein a groove is formed on the side surface of the common side wall towards the insertion port, the conductive part is embedded in the groove, and the conductive part is at least flush with an opening of the groove, or at least part of the conductive part protrudes from the opening of the groove.

7. The connection device according to claim 1, wherein a first buckle is on an inner hole wall of the through hole.

8. The connection device according to claim 1, wherein the upper shell comprises:

a panel, covering the lower shell, wherein the panel comprises a plurality of through holes, and each of the plurality of through holes corresponds to a respective one of a plurality of placement slots; and a cover plate, covering a side surface of the panel away from the lower shell.

9. The connection device according to claim 8, wherein the cover plate is fixed with the panel via glue, ultrasonic, or buckle.

10. The connection device according to claim 1, wherein:

the shell comprises a hole connected to the cavity, and the hole serves as the insertion port; and the at least part of the plurality of plug-in components are exposed through the hole.

11. The connection device according to claim 4, wherein a second end of the first connector forms a conductive part, and the conductive part is exposed through a hole.

12. The connection device according to claim 4, wherein the first connector comprises:

a metal base;

two first protruding ears, respectively set on two sides of one end of the metal base; and two second protruding ears, respectively set on two sides of another end of the metal base.

13. The connection device according to claim 12, wherein the two second protruding ears extend in the opposite two side directions away from the end of the limiting slot, to form a guiding part.

14. A plug-in device, comprising:

a cable; and a connection device electrically connected to the cable, wherein the connection device comprises:

a shell comprising a cavity and an insertion port; and a plurality of plug-in components in the cavity, wherein each of the plurality of plug-in components is electrically connected to the cable, wherein at least part of the a lower shell comprising a plurality of accommodating slots and a through hole, wherein each of the plurality of plug-in components is embedded in a respective one of the plurality of accommodating slots, and each one of the plurality of accommodating slots has a threading hole; and an upper shell, covering the lower shell, and forming the insertion port with the through hole, and forming the cavity with the plurality of accommodating slots.

15. An electrical power outlet system, comprising:

a socket comprising a first end face and a second end face, wherein the first end face comprises at least one electrical socket, and the second end face comprises a conductive column; and a connection device comprising:

a shell comprising a cavity and an insertion port; and a plurality of plug-in components in the cavity, wherein each of the plurality of plug-in components is configured to electrically connect to a cable, wherein at least part of the plurality of plug-in components are exposed via the insertion port, wherein the conductive column is inserted into the plug-in components to electrically connect with the connection device, and wherein the shell comprises:

a lower shell comprising a plurality of accommodating slots and a through hole, wherein each of the plurality of plug-in components is embedded in a respective one of the plurality of accommodating slots, and each one of the plurality of accommodating slots has a threading hole; and an upper shell, covering the lower shell, and forming the insertion port with the through hole, and forming the cavity with the plurality of accommodating slots.

16. The electrical power outlet system according to claim 15, wherein the socket is an alternating current (AC) socket, a Type-A port socket, a Type-A and Type-C port compatible socket, or a Type-C port socket.

17. The electrical power outlet system according to claim 15, wherein the second end face of the socket comprises a fixing column, and the socket and the connection device are plugged via the fixing column.

18. The electrical power outlet system according to claim 15, further comprising:

a cable connected to the connection device.

19. The electrical power outlet system according to claim 15, wherein a fixing slot is set on the shell, and the fixing slot is configured to be fixed with the socket.

* * * * *